United States Patent
Schomer et al.

(10) Patent No.: US 12,540,170 B2
(45) Date of Patent: Feb. 3, 2026

(54) CHEMOKINE RESPONSIVE ACTIVATED NATURAL KILLER CELLS WITH SECONDARY HOMING ACTIVATION FOR VERIFIED TARGETS

(71) Applicant: NantKwest, Inc., San Diego, CA (US)

(72) Inventors: Nathan Schomer, San Diego, CA (US); Laurent Boissel, San Diego, CA (US); Hans Klingemann, San Diego, CA (US)

(73) Assignee: ImmunityBio, Inc., San Diego, CA (US)

( * ) Notice: Subject to any disclaimer, the term of this patent is extended or adjusted under 35 U.S.C. 154(b) by 1254 days.

(21) Appl. No.: 17/264,990

(22) PCT Filed: Aug. 1, 2018

(86) PCT No.: PCT/US2018/044842
§ 371 (c)(1),
(2) Date: Feb. 1, 2021

(87) PCT Pub. No.: WO2020/027832
PCT Pub. Date: Feb. 6, 2020

(65) Prior Publication Data
US 2021/0324042 A1    Oct. 21, 2021

(51) Int. Cl.
*C07K 14/715* (2006.01)
*A61K 40/15* (2025.01)
*A61K 40/31* (2025.01)
*A61K 40/42* (2025.01)
*C07K 14/52* (2006.01)
*C12N 5/0783* (2010.01)

(52) U.S. Cl.
CPC .......... *C07K 14/7158* (2013.01); *A61K 40/15* (2025.01); *A61K 40/31* (2025.01); *A61K 40/4211* (2025.01); *A61K 40/4219* (2025.01); *A61K 40/4236* (2025.01); *C07K 14/521* (2013.01); *C12N 5/0646* (2013.01); *A61K 2239/48* (2023.05)

(58) Field of Classification Search
CPC ... C07K 14/7158; C07K 14/521; A61K 35/17
See application file for complete search history.

(56) References Cited

U.S. PATENT DOCUMENTS

| | | |
|---|---|---|
| 7,098,008 B2 | 8/2006 | Park et al. |
| 2002/0068044 A1 | 6/2002 | Klingemann |
| 2006/0222654 A1 | 10/2006 | Delcayre et al. |
| 2011/0206759 A1 * | 8/2011 | Swartz ............... A61P 37/06 435/325 |
| 2013/0189268 A1 | 7/2013 | Du et al. |
| 2013/0280285 A1 | 10/2013 | Schönfeld et al. |
| 2014/0242701 A1 | 8/2014 | Shiku et al. |
| 2014/0274909 A1 | 9/2014 | Orentas et al. |

FOREIGN PATENT DOCUMENTS

| | | | |
|---|---|---|---|
| CN | 1629285 A | 6/2005 | |
| WO | 1998/49268 A1 | 11/1998 | |
| WO | 1999/024566 A1 | 5/1999 | |
| WO | 2000/020460 A1 | 4/2000 | |
| WO | 2014/039523 A1 | 3/2014 | |
| WO | 2014/099671 A1 | 6/2014 | |
| WO | WO-2016044605 A1 * | 3/2016 | ............ A61K 35/17 |
| WO | WO-2016077734 A2 * | 5/2016 | ............ A61K 35/17 |
| WO | 2018/045177 A1 | 3/2018 | |

OTHER PUBLICATIONS

Klingemann, H., Boissel, L., & Toneguzzo, F. (2016). Natural killer cells for immunotherapy-advantages of the NK-92 cell line over blood NK cells. Frontiers in immunology, 7, 91. (Year: 2016).*
Ng et al, Predicting the Effects of Amino Acid Substitutions on Protein Function, Annual Review Genomics Human Genetics 7: 61-80, 2006 (Year: 2006).*
https://www.calculator.net/exponent-calculator.html; last visited Dec. 23, 2024 (Year: 2024).*
Examiner's Report, dated Feb. 25, 2022, CA Patent Application No. 3,107,101, 4 pages.
Notice of Reasons for Rejection, dated Apr. 26, 2022, JP Patent Application No. 2021-505220, 9 pages.
International Search Report and Written Opinion from PCT/US2018/044842, dated Apr. 17, 2019, 14 pages.
Klingemann, et al., "Natural Killer Cells for Immunotherapy—Advantages of the NK-92 Cell Line over Blood NK Cells," Frontiers in Immunology, 2016, vol. 7, 91, 7 pages.
Carlsten, et al., "Efficient mRNA-Based Genetic Engineering of Human NK Cells with High-Affinity CD16 and CCR7 Augments Rituximab-Induced ADCC against Lymphoma and Targets NK Cell Migration toward the Lymph Node-Associated Chemokine CCL19," Frontiers in Immunology, 2016, vol. 7, 105, 9 pages.
Somanchi, et al., "Engineering lymph node homing of ex vivo-expanded human natural killer cells via trogocytosis of the chemokine receptor CCR7," Blood, 2012, vol. 119, No. 22, pp. 5164-5172.
Carlsten, et al., "Genetic manipulation of NK cells for cancer immunotherapy: techniques and clinical implications," Frontiers in Immunology, 2015, vol. 6, Article 266, 9 pages.
Raju, et al., "Differential ligand-signaling network of CCL19/CCL21-CCR7 system," Database: The Journal of Biological Database and Curation, 2015, vol. 2015, 6 pages.

(Continued)

*Primary Examiner* — Kevin K Hill
*Assistant Examiner* — Allison Marie Johnson
(74) *Attorney, Agent, or Firm* — Kilpatrick Townsend & Stockton LLP

(57) ABSTRACT

Provided herein are modified NK-92 cells comprising a nucleic acid encoding C-C chemokine receptor type 7 (CCR7) operably linked to a promoter. Optionally, the cells further comprise a nucleic acid encoding C-C motif ligand 21 (CCL21), a nucleic acid encoding C-C motif ligand 19 (CCL19) or a combination thereof. Also provided are compositions and kits comprising the modified NK-92 cells. Provided are methods of making the modified cells and methods of treating cancer using the cells.

7 Claims, 12 Drawing Sheets
Specification includes a Sequence Listing.

(56) References Cited

OTHER PUBLICATIONS

Boissel, et al., "NK-92: An "Off the shelf" Target-Specific Cytotoxic Cell Therapeutic," Cytotherapy, 2015, vol. 17, No. issue 6 supplement, 1 page.

Tonn, et al., "Treatment of patients with advanced cancer with the natural killer cell line NK-92," Cytotherapy, 2013, vol. 15, No. 12, pp. 1563-1570.

Montaldo, et al., "Human NK Cell Receptors/Markers: A Tool to Analyze NK Cell Development, Subsets and Function," Cytometry Part A, 2013, 83A, No. 8, pp. 702-713.

Gong, et al., "Characterization of a Human Cell Line (NK-92) with Phenotypical and Functional Characteristics of Activated Natural Killer Cells, " Leukemia, 8:652-8 (1994).

Maki, et al., "Factors Regulating the Cytotoxic Activity of the Human Natural Killer Cell Line," J Hematother Stem Cell Res., 10:369-83 (2001).

Suck et al., "NK-92: an 'off-the-shelf therapeutic' for adoptive natural killer cell-based cancer immunotherapy," Cancer Immunol. Immunother. 65(4):485-92 (2016).

Klingemann, et al., "Purging of malignant cells from blood after short ex vivo incubation with NK-92 cells," Blood, 87(11):4913-4 (1996).

Swift, et al., "Natural killer cell lines preferentially kill clonogenic multiple myeloma cells and decrease myeloma engraftment in a bioluminescent xenograft mouse model," Haematologica. 97(7):1020-8 (2012).

Yan, et al., "Antileukemia Activity of a Natural Killer Cell Line against Human Leukemias," Clin Cancer Res. 4:2859-68 (1998).

Tam, et al. "Immunotherapy of Malignant Melanoma in a SCID Mouse Model Using the Highly Cytotoxic Natural Killer Cell Line NK-92," J Hematother. 8:281-90 (1999).

Konstantinidis et al "Targeting IL-2 to the endoplasmic reticulum confines autocrine growth stimulation to NK-92 cells" Exp Hematol. Feb. 2005;33(2):159-64.

Chinese Patent Application No. 201880096201.2, "First Office Action and Search Report," dated Jan. 29, 2024, 18 pages.

\* cited by examiner

CHEMOKINE RESPONSIVE ACTIVATED NATURAL KILLER CELLS WITH SECONDARY HOMING ACTIVATION FOR VERIFIED TARGETS

BACKGROUND

Cancer immunotherapies based on adoptively transferred tumor-specific cytotoxic lymphocytes hold promise for the treatment of patients with tumor malignancies. Despite of this early success in certain cancers, the treatment of tumors remains a challenge, mostly due to the immunosuppressive nature of the tumor microenvironment. In addition to modified T-cells, immunotherapies based on NK cells are being explored. NK-92 is a cytolytic cancer cell line which was discovered in the blood of a subject suffering from a non-Hodgkin's lymphoma and then immortalized ex vivo. NK-92 cells are derived from NK cells, but lack the major inhibitory receptors that are displayed by normal NK cells, while retaining the majority of the activating receptors. NK-92 cells do not, however, attack normal cells nor do they elicit an unacceptable immune rejection response in humans.

A common driver of lymph node metastasis is the hypoxia-driven upregulation of CCR7, a chemokine receptor primarily found in naïve T-cells and dendritic cells. Upregulation of the CCR7 receptor on blood NK cells has previously been demonstrated to improve the homing of NK cells to lymph nodes, allowing them to follow the same path to the lymph node compartments that are common pathways of metastatic spread, but has not yet been demonstrated in a clinically relevant cell line.

BRIEF SUMMARY

Provided herein are modified NK-92 cells comprising a nucleic acid encoding C-C chemokine receptor type 7 (CCR7) operably linked to a promoter. Optionally, the cells further comprise a nucleic acid encoding C-C motif ligand 21 (CCL21), a nucleic acid encoding C-C motif ligand 19 (CCL19) or a combination thereof. Also provided are compositions and kits comprising the modified NK-92 cells. Provided are methods of making the modified cells and methods of treating cancer using the cells.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 9A shows significant improvement of homing to tumors with CCL19 at 3 hours after dosing with NK-92 cells expressing CCR7. FIG. 9B shows increased recruitment of CCR7 expressing NK-92 cells to tumors secreting CCL19 in three out of four mice at 24 hours.

DETAILED DESCRIPTION

Figure 1:
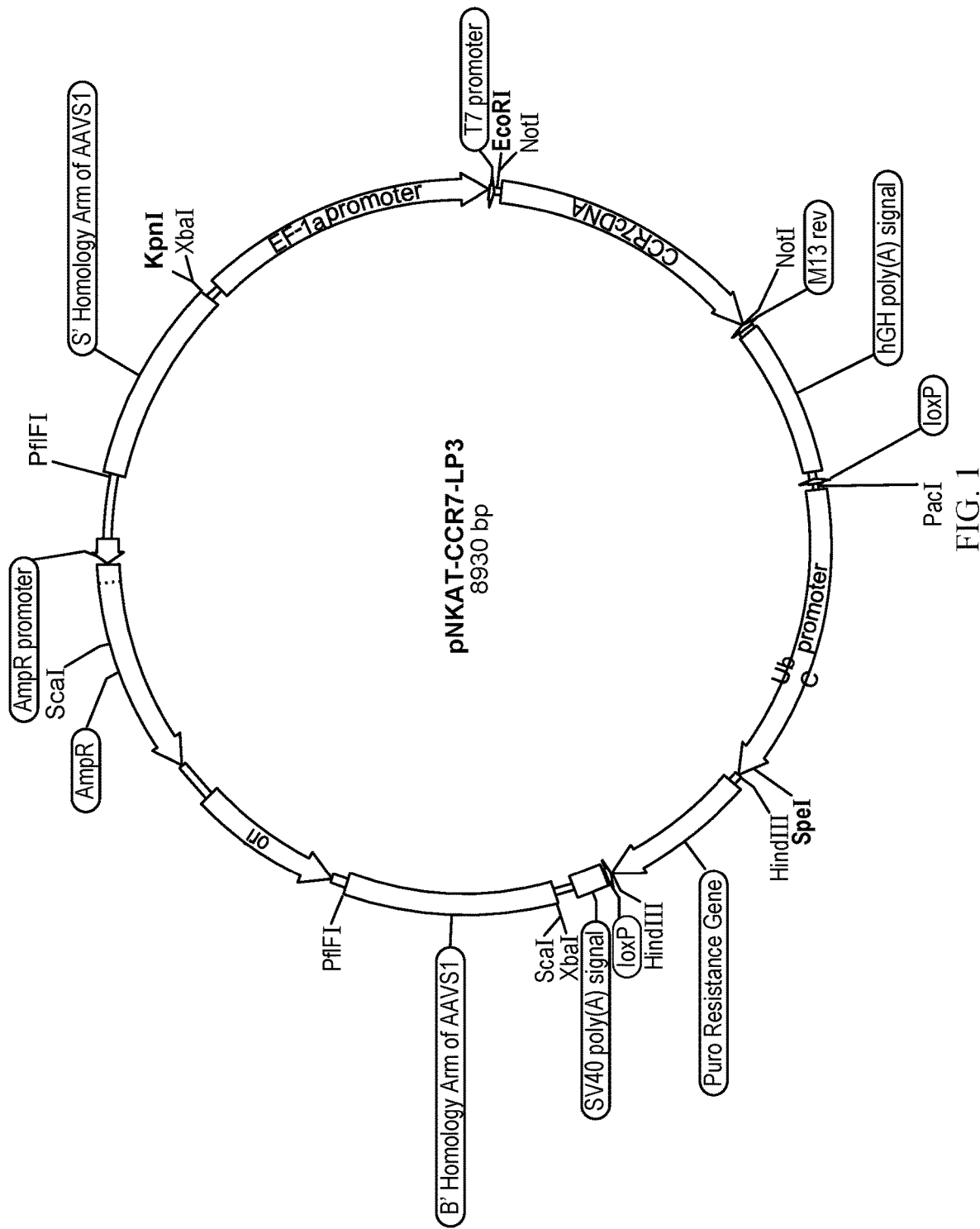
FIG. 1 is a schematic showing plasmid pNKAT-CCR7-LP3 containing the CCR7 receptor for insertion at the AAVS1 locus in NK-92 cells.
Figure 2:
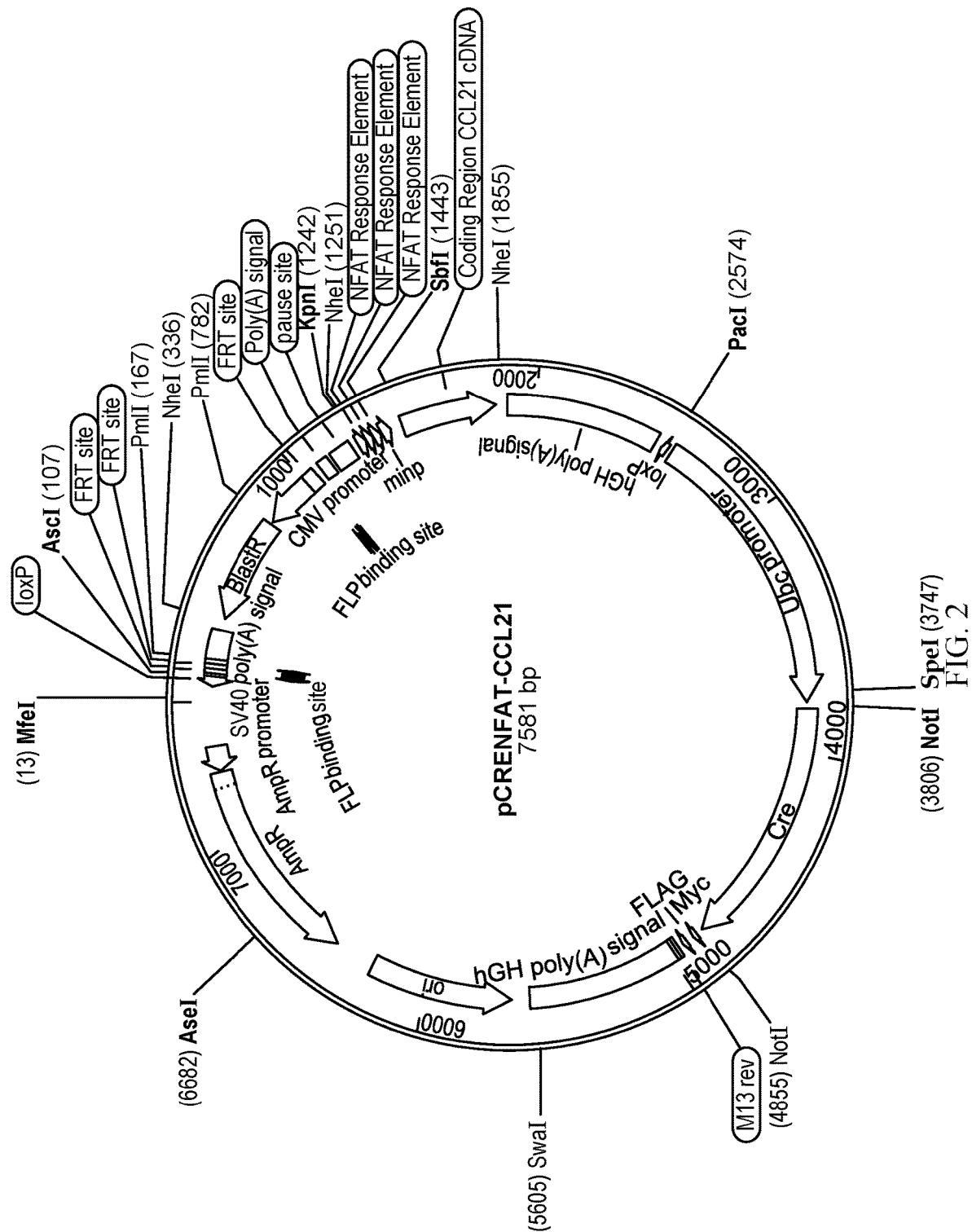
FIG. 2 is a schematic showing plasmid pCRENFAT-CCL21 that will be used for sequential integration of the NFAT-responsive CCL21 gene by replacing the Puromycin selection cassette from the first insertion of the plasmid from FIG. 1 into NK-92 cells.

Provided herein are engineered cells using the cytotoxic activated Natural Killer cell line (NK-92) as the basis to improve homing to, and behavior at lymph nodes by incorporating a chemokine receptor (CCR7) known to direct lymphocytes to lymph nodes when expressed. The engineered cells also, optionally, include a response element based upon activation of the NFAT transcription factor, which in turn secretes a ligand, CCL21 and/or CCL19, for the CCR7 receptor. Without being bound by any theory, it is believed the combination of these two enhancements will result in use of the existing CCL21 and/or CCL19 gradient to allow CCR7 on the modified cells to be targeted to lymph nodes in a patient's body. The CCL21 and/or CCL19 gradient is amplified by activation of the NFAT transcription factor and expression and secretion of CCL21 and/or CCL19 by the modified cells when metastasis is encountered at the lymph node forming a feedback loop that continues until the metastatic lesion is eliminated and CCL21 and/or CCL19 secretion by the modified cells halts.

As described herein, modified NK-92 cells have been generated with stable long-term expression of the CCR7 lymph node homing receptor driven by the Elongation Factor 1a (EF1a) promoter after electroporation with a linearized gene construct containing a CCR7 expression cassette along with a removable selection cassette comprising a selectable marker. After one week of Puromycin selection, followed by serial dilution cloning, monoclonal cell lines were established retaining a high level of CCR7 expression. These CCR7 overexpressing NK cells have functional responses to lymph node associated chemokines CCL21 and CCL19 in migration/invasion assays.

Target engagement of susceptible cell lines is shown to be recognized in NK-92 cells by activation of the NFAT transcription factor and its nuclear translocation. Target binding involving the CD16 or CD3 pathway (including ADCC or CAR mediated target recognition) is sufficient to induce NFAT activation in NK-92 cells. This was demonstrated by inserting a reporter cassette containing 3 stop region flanking NFAT binding domains and a minimal promoter driving firefly luciferase. NFAT activation by the CD3 receptor through electroporation of CD19 CAR mRNA into this reporter cell line, followed by co-culture with Sup-B15 (CD19+, but resistant to non-specific cytotoxicity) resulted in luciferase expression. A conditional CCL21 and/or CCL19 expression vector will be constructed using the same NFAT binding domains paired with a minimal promoter to drive CCL21 and/or CCL19 expression upon target recognition.

The NK-92 cell line is a human, IL-2-dependent NK cell line that was established from the peripheral blood mononuclear cells (PBMCs) of a 50-year-old male diagnosed with non-Hodgkin lymphoma (Gong, et al., Leukemia. 8:652-8 (1994)). NK-92 cells are characterized by the expression of $CD56^{bright}$ and CD2, in the absence of CD3, CD8, and CD16. A $CD56^{bright}/CD16^{neg}$/low phenotype is typical for a minor subset of NK cells in peripheral blood, which have immunomodulatory functions as cytokine producers. Unlike normal NK cells, NK-92 lacks expression of most killer cell inhibitor receptors (KIRs) (Maki, et al., J Hematother Stem Cell Res. 10:369-83 (2001)). Only KIR2DL4, a KIR receptor with activating function and inhibitory potential that is expressed by all NK cells, was detected on the surface of NK-92. KIR2DL4 is considered to mediate inhibitory effects through binding to the HLA allele G (Suck, Cancer Immunol. Immunother. 65(4):485-92 (2015)). The predominant pathway of cytotoxic killing of NK-92 cells is through the perforin/esterase pathway; NK-92 expresses high levels of perforin and granzyme B (Maki, et al., J Hematother Stem Cell Res. 10:369-83 (2001)).

NK-92 cells have a very broad cytotoxic range and are active against cell lines derived from hematologic malignancies and solid tumors (Klingemann, Blood, 87(11):4913-4 (1996); Swift, Haematologica. 97(7):1020-8 (2012); Yan, et al., Clin Cancer Res. 4:2859-68 (1998)). Safety assessments in severe combined immunodeficiency (SCID) mice showed no NK-92 treatment-related effects, such as acute toxicity or long-term carcinogenicity (Tam, et al., J Hematother. 8:281-90 (1999), Yan, et al., Clin Cancer Res. 4:2859-68 (1998)). Administration of NK-92 cells to mice challenged with human leukemia cells or mouse models of human melanoma resulted in improved survival and suppression of tumor growth, including complete remissions in some mouse tumors (Tam, et al., J Hematother. 8:281-90 (1999), Yan, et al., Clin Cancer Res. 4:2859-68 (1998)). Phase I clinical trials have confirmed its safety profile. Characterization of the NK-92 cell line is disclosed in WO 1998/49268 and U.S. Patent Application Publication No. 2002-0068044, which are incorporated by reference herein in their entireties.

Optionally, the modified NK-92 cells may also express the Fc receptor CD16. As used herein, the term "Fc receptor" refers to a protein found on the surface of certain cells (e.g., natural killer cells) that contribute to the protective functions of the immune cells by binding to part of an antibody known as the Fc region. Binding of the Fc region of an antibody to the Fc receptor (FcR) of a cell stimulates phagocytic or cytotoxic activity of a cell via antibody-mediated phagocytosis or antibody-dependent cell-mediated cytotoxicity (ADCC). FcRs are classified by the type of antibody they recognize. For example, Fc-gamma receptors (FCγR) bind to the IgG class of antibodies. FCγRIII-A (also called CD16) is a low affinity Fc receptor that binds to IgG antibodies and activates ADCC. FCγRIII-A are typically found on NK cells. A representative amino acid sequence encoding CD16 is shown in SEQ ID NO:12. A representative polynucleotide sequence encoding CD16 is shown in SEQ ID NO: 13. The complete sequences of CD16 can be found in the SwissProt database as entry P08637.

Optionally, the modified NK-92 cells comprise a nucleic acid sequence with 70%, 80%, 90%, or 95% identity to SEQ ID NO:13. Optionally, the modified NK-92 cells comprise a nucleic acid sequence with 90%, 91%, 92%, 93%, 94%, 95%, 96%, 97%, 98% or 99% identity to SEQ ID NO:13. Optionally, the modified NK-92 cells comprise a polypeptide with 70%, 80%, 90%, or 95% identity to SEQ ID NO: 12. Optionally, the modified NK-92 cells comprise a polypeptide with 90%, 91%, 92%, 93%, 94%, 95%, 96%, 97%, 98% or 99% identity to SEQ ID NO:12.

The cytotoxicity of NK-92 cells is dependent on the presence of cytokines (e.g., interleukin-2 (IL-2)). Thus, optionally, modified NK-92 cells are further modified to express at least one cytokine. Optionally, the at least one cytokine is IL-2, IL-12, IL-15, IL-18, IL-21 or a variant thereof. Optionally, the at least one cytokine is IL-2, IL-15 or a combination thereof. Optionally, the IL-2 is expressed with a signal sequence that directs the IL-2 to the endoplasmic reticulum. Directing the IL-2 to the endoplasmic reticulum permits expression of IL-2 at levels sufficient for autocrine activation and without releasing substantial amounts of IL-2 extracellularly. See Konstantinidis et al "Targeting IL-2 to the endoplasmic reticulum confines autocrine growth stimulation to NK-92 cells" Exp Hematol. 2005 February; 33(2):159-64. A representative nucleic acid encoding IL-2 is shown in SEQ ID NO:14 and a representative polypeptide of IL-2 is shown in SEQ ID NO:15.

Optionally, the modified NK-92 cells comprise a nucleic acid sequence with 70%, 80%, 90%, or 95% identity to SEQ ID NO:14. Optionally, the modified NK-92 cells comprise a nucleic acid sequence with 90%, 91%, 92%, 93%, 94%, 95%, 96%, 97%, 98% or 99% identity to SEQ ID NO:14. Optionally, the modified NK-92 cells comprise a polypeptide with 70%, 80%, 90%, or 95% identity to SEQ ID NO:15. Optionally, the modified NK-92 cells comprise a polypeptide with 90%, 91%, 92%, 93%, 94%, 95%, 96%, 97%, 98% or 99% identity to SEQ ID NO:15. The provided modified NK-92 cells advantageously are capable of being maintained in the absence of IL-2 without secreting IL-2 in an amount to cause a clinical adverse effect.

Optionally, the modified NK-92 cells are further engineered to express a chimeric antigen receptor (CAR) on the cell surface. Optionally, the CAR is specific for a tumor-specific antigen. Tumor-specific antigens are described, by way of non-limiting example, in US 2013/0189268; WO 1999024566 A1; U.S. Pat. No. 7,098,008; and WO 2000020460 A1, each of which is incorporated herein by reference in its entirety. Tumor-specific antigens include, without limitation, NKG2D, CS1, GD2, CD138, EpCAM, EBNA3C, GPA7, CD244, CA-125, ETA, MAGE, CAGE, BAGE, HAGE, LAGE, PAGE, NY-SEO-1, GAGE, CEA, CD52, CD30, MUC5AC, c-Met, EGFR, FAB, WT-1, PSMA, NY-ESO1, AFP, CEA, CTAG1B, CD19 and CD33. CARs can be engineered as described, for example, in Patent Publication Nos. WO 2014039523; US 20140242701; US 20140274909; US 20130280285; and WO 2014099671, each of which is incorporated herein by reference in its entirety. Optionally, the CAR is a CD19 CAR, a CD33 CAR or CSPG-4 CAR.

Provided herein are modified NK-92 cells comprising a nucleic acid encoding C-C chemokine receptor type 7 (CCR7) operably linked to a promoter. Optionally, the nucleic acid encoding CCR7 has at least 90%, 91%, 92%, 93%, 94%, 95%, 96%, 97%, 98% or 99% identity to SEQ ID NO:1. Optionally, the CCR7 is expressed on the cell surface of the modified NK-92 cells. Optionally, the modified NK-92 cell further comprises a nucleic acid encoding C-C motif ligand 21 (CCL21) operably linked to a promoter. Optionally, the nucleic acid encoding CCL21 has at least 90%, 91%, 92%, 93%, 94%, 95%, 96%, 97%, 98% or 99% identity to SEQ ID NO:2. Optionally, the modified NK-92 cell further comprises a nucleic acid encoding C-C motif ligand 19 (CCL19) operably linked to a promoter. Optionally, the nucleic acid encoding CCL19 has at least 90%, 91%, 92%, 93%, 94%, 95%, 96%, 97%, 98% or 99% identity to SEQ ID NO:16. Optionally, the promoter comprises one or more NFAT binding elements and a minimal promoter. Optionally, the promoter has at least 90%, 91%, 92%, 93%, 94%, 95%, 96%, 97%, 98% or 99% identity to SEQ ID NO:6. Optionally, the modified cells comprise a nucleic acid encoding CCL19 and CCL21. Optionally, the nucleic acid encoding CCL21 is linked to the nucleic acid encoding CCL19 by a 2A peptide linker. Optionally, the 2A peptide linker comprises SEQ ID NO:17 or 18. Optionally, the modified NK-92 cells further comprises a CAR. Optionally, the CAR is CD19. Optionally, the modified NK-92 cells further comprises an Fc Receptor. Optionally, the Fc Receptor is CD16. Optionally, the modified NK-92 cells further comprises a cytokine. Optionally, the cytokine is IL-2.

Provided herein are expression vectors comprising a nucleic acid encoding CCR7. Optionally, the expression vector further comprises a nucleic acid encoding CCL21. Optionally, the expression vector further comprises a nucleic acid encoding CCL19. Optionally, the expression vector comprises nucleic acids encoding CCR7, CCL21 and CCL19, optionally, each being operably linked to the same or different promoters. Optionally, the nucleic acids encoding CCR7 and CCL21 are operably linked to a promoter. Optionally, the nucleic acids are operably linked to the same promoter. Optionally, the nucleic acid encoding CCR7 is operably linked to a first promoter and the nucleic acid encoding CCL21 is operably linked to a second promoter. Optionally, the second promoter drives expression of CCL21 and CCL19. Optionally, the nucleic acid encoding CCL21 and CCL19 are linked by a 2A peptide linker. Exemplary promoters include, but are not limited to, the CMV promoter, ubiquitin promoter, PGK promoter, and EF1 also promoter. Optionally, provided herein are expression vectors comprising a nucleic acid having SEQ ID NO:1 or a nucleic acid with 90%, 91%, 92%, 93%, 94%, 95%, 96%, 97%, 98% or 99% identity to SEQ ID NO:1. Optionally, the nucleic acid is operably linked to a promoter. Optionally, the promoter is selected from the group consisting of SEQ ID NOs:3, 9, 10 or 11 or a promoter having 90%, 91%, 92%, 93%, 94%, 95%, 96%, 97%, 98% or 99% identity to SEQ ID NOs:3, 9, 10 or 11. Also provided are expression vectors comprising a nucleic acid having SEQ ID NO:2 or a nucleic acid with 90%, 91%, 92%, 93%, 94%, 95%, 96%, 97%, 98% or 99% identity to SEQ ID NO:2. Optionally, the nucleic acid is operably linked to a promoter. Optionally, the promoter comprises SEQ ID NO:4 and/or SEQ ID NO:5. Optionally, the promoter comprises SEQ ID NO:6 or a nucleic acid with 90%, 91%, 92%, 93%, 94%, 95%, 96%, 97%, 98% or 99% identity to SEQ ID NO:6. Optionally, the provided expression vector comprises both SEQ ID NO:1 or a nucleic acid with 90%, 91%, 92%, 93%, 94%, 95%, 96%, 97%, 98% or 99% identity to SEQ ID NO:1 and SEQ ID NO:2 or a nucleic acid with 90%, 91%, 92%, 93%, 94%, 95%, 96%, 97%, 98% or 99% identity to SEQ ID NO:2. Suitable expression vectors are known and can be used. Optionally, the expression vector is a plasmid.

Provided herein are methods of making modified NK-92 cells comprising CCR7 and, optionally, CCL21 and/or CCL19. The methods include transforming NK-92 cells with an expression vector comprising a nucleic acid encoding CCR7 operably linked to a promoter. Optionally, the methods further include transforming the modified NK-92 cells comprising CCR7 with a second expression vector comprising a nucleic acid encoding CCL21 operably linked to a promoter. The second expression vector may further include a nucleic acid encoding CCL19 operably linked to the same or different promoter than CCL21. Optionally, the methods include further transforming the modified NK-92 cells comprising CCR7 and CCL21 with a third expression vector comprising a nucleic acid encoding CCL19. Optionally, the methods include transforming NK-92 cells with an expression vector comprising a nucleic acid encoding CCR7, a nucleic acid encoding CCL21, a nucleic acid encoding CCL19 or any combination thereof. The expression vector may further comprise a promoter operably linked to the nucleic acid encoding CCR7, which may be used to express CCL21 and/or CCL19 or, alternatively, the expression vector may further comprise a different promoter operably linked to CCL21 and/or CCL19. Optionally, the promoter operably linked to CCL21 and/or CCL19 is responsive to NFAT transcriptor activation.

As used herein, the terms promoter, promoter element, and regulatory sequence refer to a polynucleotide that regulates expression of a selected polynucleotide sequence operably linked to the promoter, and that effects expression of the selected polynucleotide sequence in cells. The term Thraustochytrium promoter, as used herein, refers to a promoter that functions in a Thraustochytrium cell. In some embodiments, a promoter element is or comprises untranslated regions (UTR) in a position 5' of coding sequences. 5' UTRs form part of the mRNA transcript and so are an integral part of protein expression in eukaryotic organisms. Following transcription 5'UTRs can regulate protein expression at both the transcription and translation levels. Promoters controlling transcription from vectors in mammalian host cells may be obtained from various sources, for example, the genomes of viruses such as polyoma, Simian Virus 40 (SV40), adenovirus, retroviruses, hepatitis B virus and cytomegalovirus (e.g., SEQ ID NO:11), or from heterologous mammalian promoters, e.g. beta actin promoter, Eukaryotic translation elongation factor 1 alpha 1 (EF1α) promoter (e.g., SEQ ID NO:3), phosphoglycerate kinase (PGK) promoter (e.g., SEQ ID NO:10) and ubiquitin promoter (e.g., SEQ ID NO:9). Provided herein are promoters having 90%, 91%, 92%, 93%, 94%, 95%, 96%, 97%, 98% or 99% identity to SEQ ID NOs:3, 9, 10 or 11.

The phrase selectable marker, as used herein, refers either to a nucleotide sequence, e.g., a gene, that encodes a product (polypeptide) that allows for selection, or to the gene product (e.g., polypeptide) itself. The term selectable marker is used herein as it is generally understood in the art and refers to a marker whose presence within a cell or organism confers a significant growth or survival advantage or disadvantage on the cell or organism under certain defined culture conditions (selective conditions). The phrase selection agent, as used herein refers to an agent that introduces a selective pressure on a cell or populations of cells either in favor of or against the cell or population of cells that bear a selectable marker. For example, the selection agent is an antibiotic and the selectable marker is an antibiotic resistance gene. Examples of suitable selectable markers for mammalian cells are dihydrofolate reductase (DHFR), thymidine kinase, neomycin, neomycin analog G418, hydromycin, and puromycin.

Nucleic acid, as used herein, refers to deoxyribonucleotides or ribonucleotides and polymers and complements thereof. The term includes deoxyribonucleotides or ribonucleotides in either single- or double-stranded form. The term encompasses nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphorothioates, phosphoramidates, methyl phosphonates, chiral-methyl phosphonates, 2-O-methyl ribonucleotides, peptide-nucleic acids (PNAs). Unless otherwise indicated, conservatively modified variants of nucleic acid sequences (e.g., degenerate codon substitutions) and complementary sequences can be used in place of a particular nucleic acid sequence recited herein. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); Rossolini et al., Mol. Cell. Probes 8:91-98 (1994)). The term nucleic acid is used interchangeably with gene, cDNA, mRNA, oligonucleotide, and polynucleotide.

A nucleic acid is operably linked when it is placed into a functional relationship with another nucleic acid sequence. For example, DNA that encodes a presequence or secretory leader is operably linked to DNA that encodes a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, operably linked means that the DNA sequences being linked are near each other, and, in the case of a secretory leader, contiguous and in reading phase. However, enhancers do not have to be contiguous. For example, a nucleic acid sequence that is operably linked to a second nucleic acid sequence is covalently linked, either directly or indirectly, to such second sequence, although any effective three-dimensional association is acceptable. A single nucleic acid sequence can be operably linked to multiple other sequences. For example, a single promoter can direct transcription of multiple RNA species. Linking can be accomplished by ligation at convenient restriction sites. If such sites do not exist, the synthetic oligonucleotide adaptors or linkers are used in accordance with conventional practice.

The terms identical or percent identity, in the context of two or more nucleic acids or polypeptide sequences, refer to two or more sequences or subsequences that are the same or have a specified percentage of amino acid residues or nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be substantially identical. This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 25 amino acids or nucleotides in length, or more preferably over a region that is 50-100 amino acids or nucleotides in length.

For sequence comparison, typically one sequence acts as a reference sequence, to which test sequences are compared. When using a sequence comparison algorithm, test and reference sequences are entered into a computer; subsequence coordinates are designated, if necessary; and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

A comparison window, as used herein, includes reference to a segment of any one of the number of contiguous positions selected from the group consisting of from 20 to 600, usually about 50 to about 200, more usually about 100 to about 150, in which a sequence may be compared to a reference sequence of the same number of contiguous positions after the two sequences are optimally aligned. Methods of alignment of sequences for comparison are well-known in the art. Optimal alignment of sequences for comparison can be conducted, e.g., by the local homology algorithm of Smith & Waterman, Adv. Appl. Math. 2:482 (1981); by the homology alignment algorithm of Needleman & Wunsch, J. Mol. Biol. 48:443 (1970); by the search for similarity method of Pearson & Lipman, Proc. Nat'l. Acad. Sci. USA 85:2444 (1988); by computerized implementations of these algorithms (GAP, BESTFIT, FASTA, and TFASTA in the Wisconsin Genetics Software Package, Genetics Computer Group, 575 Science Dr., Madison, WI); or by manual alignment and visual inspection (see, e.g., Current Protocols in Molecular Biology (Ausubel et al., eds. 1995 supplement)).

A preferred example of an algorithm that is suitable for determining percent sequence identity and sequence similarity are the BLAST and BLAST 2.0 algorithms, which are described in Altschul et al., Nuc. Acids Res. 25:3389-3402 (1977), and Altschul et al., J. Mol. Biol. 215:403-410 (1990), respectively. BLAST and BLAST 2.0 are used, with the parameters described herein, to determine percent sequence identity for nucleic acids or proteins. Software for performing BLAST analyses is publicly available through the National Center for Biotechnology Information, as known in the art. This algorithm involves first identifying high scoring sequence pairs (HSPs) by identifying short words of a selected length (W) in the query sequence, which either match or satisfy some positive-valued threshold score T when aligned with a word of the same length in a database sequence. T is referred to as the neighborhood word score threshold (Altschul et al., supra). These initial neighborhood word hits act as seeds for initiating searches to find longer HSPs containing them. The word hits are extended in both directions along each sequence for as far as the cumulative alignment score can be increased. Cumulative scores are calculated for nucleotide sequences using the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The Expectation value (E) represents the number of different alignments with scores equivalent to or better than what is expected to occur in a database search by chance. The BLASTN program (for nucleotide sequences) uses as defaults a wordlength (W) of 11, an expectation (E) of 10, M=5, N=−4 and a comparison of both strands. For amino acid sequences, the BLASTP program uses as defaults a wordlength of 3, expectation (E) of 10, and the BLOSUM62 scoring matrix (see Henikoff & Henikoff, Proc. Natl. Acad. Sci. USA 89:10915 (1989)), alignments (B) of 50, expectation (E) of 10, M=5, N=−4, and a comparison of both strands.

The term transformation as used herein refers to a process by which an exogenous or heterologous nucleic acid molecule (e.g., a vector or recombinant nucleic acid molecule) is introduced into a recipient cell. The exogenous or heterologous nucleic acid molecule may or may not be integrated into (i.e., covalently linked to) chromosomal DNA making up the genome of the host cell. For example, the exogenous or heterologous polynucleotide may be maintained on an episomal element, such as a plasmid. Alternatively or additionally, the exogenous or heterologous polynucleotide may become integrated into a chromosome so that it is inherited by daughter cells through chromosomal replication. Methods for transformation include, but are not limited to, calcium phosphate precipitation; fusion of recipient cells with bacterial protoplasts containing the recombinant nucleic acid; treatment of the recipient cells with liposomes containing the recombinant nucleic acid; DEAE dextran; fusion using polyethylene glycol (PEG); electroporation; magnetoporation; biolistic delivery; retroviral infection; lipofection; and micro-injection of DNA directly into cells.

The term transformed, as used in reference to cells, refers to cells that have undergone transformation as described herein such that the cells carry exogenous or heterologous genetic material (e.g., a recombinant nucleic acid). The term transformed can also or alternatively be used to refer to cells, types of cells, tissues, organisms, etc. that contain exogenous or heterologous genetic material.

The term introduce, as used herein with reference to introduction of a nucleic acid into a cell or organism, is intended to have its broadest meaning and to encompass introduction, for example by transformation methods (e.g., calcium-chloride-mediated transformation, electroporation, particle bombardment), and also introduction by other methods including transduction, conjugation, and mating. Optionally, a construct is utilized to introduce a nucleic acid into a cell or organism.

The terms modified and recombinant when used with reference to a cell, nucleic acid, polypeptide, vector, or the like indicates that the cell, nucleic acid, polypeptide, vector or the like has been modified by or is the result of laboratory methods and is non-naturally occurring. Thus, for example, modified cells include cells produced by or modified by laboratory methods, e.g., transformation methods for introducing nucleic acids into the cell. Modified cells can include nucleic acid sequences not found within the native (non-recombinant) form of the cells or can include nucleic acid sequences that have been altered, e.g., linked to a non-native promoter.

As used herein, the term exogenous refers to a substance, such as a nucleic acid (e.g., nucleic acids including regulatory sequences and/or genes) or polypeptide, that is artificially introduced into a cell or organism and/or does not naturally occur in the cell in which it is present. In other words, the substance, such as nucleic acid or polypeptide, originates from outside a cell or organism into which it is introduced. An exogenous nucleic acid can have a nucleotide sequence that is identical to that of a nucleic acid naturally present in the cell. For example, an NK-92 cell can be engineered to include a nucleic acid having a NK-92 sequence, e.g., heparanase. Optionally, an endogenous NK-92 heparanase sequence is operably linked to a gene with which the regulatory sequence is not involved under natural conditions. Although the NK-92 heparanase sequence may naturally occur in the host cell, the introduced nucleic acid is exogenous according to the present disclosure. An exogenous nucleic acid can have a nucleotide sequence that is different from that of any nucleic acid that is naturally present in the cell. For example, the exogenous nucleic acid can be a heterologous nucleic acid, i.e., a nucleic acid from a different species or organism. Thus, an exogenous nucleic acid can have a nucleic acid sequence that is identical to that of a nucleic acid that is naturally found in a source organism but that is different from the cell into which the exogenous nucleic acid is introduced. As used herein, the term endogenous, refers to a nucleic acid sequence that is native to a cell. As used herein, the term heterologous refers to a nucleic acid sequence that is not native to a cell, i.e., is from a different organism than the cell. The terms exogenous and endogenous or heterologous are not mutually exclusive. Thus, a nucleic acid sequence can be exogenous and endogenous, meaning the nucleic acid sequence can be introduced into a cell but have a sequence that is the same as or similar to the sequence of a nucleic acid naturally present in the cell. Similarly, a nucleic acid sequence can be exogenous and heterologous meaning the nucleic acid sequence can be introduced into a cell but have a sequence that is not native to the cell, e.g., a sequence from a different organism.

As described herein, a control or standard control refers to a sample, measurement, or value that serves as a reference, usually a known reference, for comparison to a test sample, measurement, or value. For example, a test cell, e.g., a cell transformed with nucleic acid sequences encoding genes for an Fc Receptor can be compared to a known normal (wild-type) cell (e.g., a standard control cell). A standard control can also represent an average measurement or value gathered from a population of cells (e.g., standard control cells) that do not express the Fc Receptor or that do not have or have minimal levels of Fc Receptor activity. One of skill will recognize that standard controls can be designed for assessment of any number of parameters (e.g., RNA levels, polypeptide levels, specific cell types, and the like).

As used herein, the term "cancer" refers to all types of cancer, neoplasm, or malignant tumors found in mammals, including leukemia, carcinomas and sarcomas. Exemplary cancers include cancer of the brain, breast, cervix, colon, head & neck, liver, kidney, lung, non-small cell lung, melanoma, mesothelioma, ovary, sarcoma, stomach, uterus and Medulloblastoma. Additional examples include, Hodgkin's Disease, Non-Hodgkin's Lymphoma, multiple myeloma, neuroblastoma, ovarian cancer, rhabdomyosarcoma, primary thrombocytosis, primary macroglobulinemia, primary brain tumors, cancer, malignant pancreatic insulinoma, malignant carcinoid, urinary bladder cancer, premalignant skin lesions, testicular cancer, lymphomas, thyroid cancer, neuroblastoma, esophageal cancer, genitourinary tract cancer, malignant hypercalcemia, endometrial cancer, adrenal cortical cancer, neoplasms of the endocrine and exocrine pancreas, and prostate cancer.

As used herein, the terms "metastasis," "metastatic," and "metastatic cancer" can be used interchangeably and refer to the spread of a proliferative disease or disorder, e.g., cancer, from one organ or another non-adjacent organ or body part. Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast.

As used herein, "treating" or "treatment of" a condition, disease or disorder or symptoms associated with a condition, disease or disorder refers to an approach for obtaining beneficial or desired results, including clinical results. Beneficial or desired clinical results can include, but are not limited to, alleviation or amelioration of one or more symptoms or conditions, diminishment of extent of condition, disorder or disease, stabilization of the state of condition, disorder or disease, prevention of development of condition, disorder or disease, prevention of spread of condition, disorder or disease, delay or slowing of condition, disorder or disease progression, delay or slowing of condition, disorder or disease onset, amelioration or palliation of the condition, disorder or disease state, and remission, whether partial or total. "Treating" can also mean prolonging survival of a subject beyond that expected in the absence of treatment. "Treating" can also mean inhibiting the progression of the condition, disorder or disease, slowing the progression of the condition, disorder or disease temporarily, although in some instances, it involves halting the progression of the condition, disorder or disease permanently. As used herein the terms treatment, treat, or treating refers to a method of reducing the effects of one or more symptoms of a disease or condition characterized by expression of the protease or symptom of the disease or condition characterized by expression of the protease. Thus in the disclosed method, treatment can refer to a 10%, 20%, 30%, 40%, 50%, 60%, 70%, 80%, 90%, or 100% reduction in the severity of an established disease, condition, or symptom of the disease or condition. For example, a method for treating a disease is considered to be a treatment if there is a 10% reduction in one or more symptoms of the disease in a subject as compared to a control. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disease, condition, or symptoms of the disease or condition. Further, as used herein, references to decreasing, reducing, or inhibiting include a change of 10%, 20%, 30%, 40%, 50%, 60%, 70%, 80%, 90% or greater as compared to a control level and such terms can include but do not necessarily include complete elimination.

The terms subject, patient, individual, etc. are not intended to be limiting and can be generally interchanged. That is, an individual described as a patient does not necessarily have a given disease, but may be merely seeking medical advice. As used throughout, a subject can be a vertebrate, more specifically a mammal (e.g., a human, horse, cat, dog, cow, pig, sheep, goat, mouse, rabbit, rat, and guinea pig), birds, reptiles, amphibians, fish, and any other animal. The term does not denote a particular age or sex. Thus, adult and newborn subjects, whether male or female, are intended to be covered. As used herein, patient, individual and subject may be used interchangeably and these terms are not intended to be limiting. That is, an individual described as a patient does not necessarily have a given disease, but may be merely seeking medical advice. The terms patient or subject include human and veterinary subjects.

"Administration" or "administering," as used herein, refers to providing, contacting, and/or delivering a compound or compounds by any appropriate route to achieve the desired effect. Administration may include, but is not limited to, oral, sublingual, parenteral (e.g., intravenous, subcutaneous, intracutaneous, intramuscular, intraarticular, intraarterial, intrasynovial, intrasternal, intrathecal, intralesional or intracranial injection), transdermal, topical, buccal, rectal, vaginal, nasal, ophthalmic, via inhalation, and implants. Optionally, the NK-92 cells are administered parenterally. Optionally, the NK-92 cells are administered intravenously. Optionally, the NK-92 cells are administered peritumorally.

Thus, provided herein are methods of reducing cancer metastasis in a subject comprising administering to the subject a therapeutically effective amount of modified NK-92 cells expressing CCR7 on its cell surface, thereby reducing cancer metastasis in the subject. Also provided are methods of treating cancer in a subject, which include the steps of selecting a subject having cancer and administering to the subject a therapeutically effective amount of modified NK-92 cells expressing CCR7 on its cell surface, wherein administration treats the cancer in the subject. Optionally, the cells further express CCL21. Optionally, the methods further include administering to the subject an additional therapeutic agent.

The NK-92 cells may be administered to the subject by a variety of routes. For example, the NK-92 cells can be administered to the subject by infusion (e.g., intravenous infusion) over a period of time. Typically, for a single dose of NK-92 cells, the period of time is between 5 and 130 minutes. Optionally, the period of time is between 90 and 120 minutes. Optionally, the period of time is between 15 to 30 minutes.

The NK-92 cells, and optionally other anti-cancer agents can be administered once to a patient with cancer can be administered multiple times, e.g., once every 1, 2, 3, 4, 5, 6, 7, 8, 9, 10, 11, 12, 13, 14, 15, 16, 17, 18, 19, 20, 21, 22 or 23 hours, or once every 1, 2, 3, 4, 5, 6 or 7 days, or once every 1, 2, 3, 4, 5, 6, 7, 8, 9, 10 or more weeks during therapy, or any ranges between any two of the numbers, end points inclusive. Thus, for example, NK-92 cells can be administered to the subject once daily for 1, 2, 3, 4, 5, 6, 7, 8, 9, 10, 11, 12, 13, 14, 15, 16, 17, 18, 19, 20 or more days. Optionally, the NK-92 cells are administered in a cycle of once daily for two days. The cycle is then followed by one or more hours, days, or weeks of no treatment with NK-92 cells. As used herein, the term "cycle" refers to a treatment that is repeated on a regular schedule with periods of rest (e.g., no treatment or treatment with other agents) in between. For example, treatment given for one week followed by two weeks of rest is one treatment cycle. Such cycles of treatment can be repeated one or more times. Thus, the NK-92 cells can be administered in 1, 2, 3, 4, 5, 6, 7, 8, 9, 10, 11, 12, 13, 14, 15, 16, 17, 18, 19, 20 or more cycles.

NK-92 cells can be administered to a subject by absolute numbers of cells, e.g., said subject can be administered from about 1000 cells/injection to up to about 10 billion cells/injection, such as at about, at least about, or at most about, $1\times10^{10}$, $1\times10^9$, $1\times10^8$, $1\times10^7$, $5\times10^7$, $1\times10^6$, $5\times10^6$, $1\times10^5$, $5\times10^5$, $1\times10^4$, $5\times10^4$, $1\times10^3$, $5\times10^3$ (and so forth) NK-92 cells per injection, or any ranges between any two of the numbers, end points inclusive. Optionally, from $1\times10^8$ to $1\times10^{10}$ cells are administered to the subject. Optionally, the cells are administered one or more times weekly for one or more weeks. Optionally, the cells are administered once or twice weekly for 1, 2, 3, 4, 5, 6, 7, 8, 9, 10 or more weeks.

Optionally, subject are administered from about 1000 cells/injection/m² to up to about 10 billion cells/injection/ m², such as at about, at least about, or at most about, $1\times10^{10}/m^2$, $1\times10^9/m^2$, $1\times10^8/m^2$, $1\times10^7/m^2$, $5\times10^7/m^2$, $1\times10^6/m^2$, $5\times10^6/m^2$, $1\times10^5/m^2$, $5\times10^5/m^2$, $1\times10^4/m^2$, $5\times10^4/m^2$, $1\times10^3/m^2$, $5\times10^3/m^2$ (and so forth) NK-92 cells per injection, or any ranges between any two of the numbers, end points inclusive. Optionally, from $1\times10^3$ to $1\times10^{10}$, per m² of the NK-92 cells are administered to the subject. Optionally, $2\times10^9$ per m², of the NK-92 cells are administered to the subject.

Optionally, NK-92 cells can be administered to such individual by relative numbers of cells, e.g., said individual can be administered about 1000 cells to up to about 10 billion cells per kilogram of the individual, such as at about, at least about, or at most about, $1\times10^{10}$, $1\times10^9$, $1\times10^8$, $1\times10^7$, $5\times10^7$, $1\times10^6$, $5\times10^6$, $1\times10^5$, $5\times10^5$, $1\times10^4$, $5\times10^4$, $1\times10^3$, $5\times10^3$ (and so forth) NK-92 cells per kilogram of the individual, or any ranges between any two of the numbers, end points inclusive.

Optionally, the total dose may calculated by m² of body surface area, including about $1\times10^{11}$, $1\times10^{10}$, $1\times10^9$, $1\times10^8$, $1\times10^7$, per m², or any ranges between any two of the numbers, end points inclusive. Optionally, between about 1 billion and about 3 billion NK-92 cells are administered to a patient. Optionally, the amount of NK-92 cells injected per dose may calculated by m2 of body surface area, including $1\times10^{11}$, $1\times10^{10}$, $1\times10^9$, $1\times10^8$, $1\times10^7$, $1\times10^6$, $1\times10^5$, $1\times10^4$, $1\times10^3$, per m².

Optionally, NK-92 cells are administered in a composition comprising NK-92 cells and a medium, such as human serum or an equivalent thereof. Optionally, the medium comprises human serum albumin. Optionally, the medium comprises human plasma. Optionally, the medium comprises about 1% to about 15% human serum or human serum equivalent. Optionally, the medium comprises about 1% to about 10% human serum or human serum equivalent. Optionally, the medium comprises about 1% to about 5% human serum or human serum equivalent. Optionally, the medium comprises about 2.5% human serum or human serum equivalent. Optionally, the serum is human AB serum. Optionally, a serum substitute that is acceptable for use in human therapeutics is used instead of human serum. Such serum substitutes may be known in the art. Optionally, NK-92 cells are administered in a composition comprising NK-92 cells and an isotonic liquid solution that supports cell viability. Optionally, NK-92 cells are administered in a composition that has been reconstituted from a cryopreserved sample.

According to the methods provided herein, the subject is administered an effective amount of one or more of the agents provided herein. The terms effective amount and effective dosage are used interchangeably. The term effective amount is defined as any amount necessary to produce a desired physiologic response (e.g., reduction of inflammation). Effective amounts and schedules for administering the agent may be determined empirically by one skilled in the art. The dosage ranges for administration are those large enough to produce the desired effect in which one or more symptoms of the disease or disorder are affected (e.g., reduced or delayed). The dosage should not be so large as to cause substantial adverse side effects, such as unwanted cross-reactions, anaphylactic reactions, and the like. Generally, the dosage will vary with the age, condition, sex, type of disease, the extent of the disease or disorder, route of administration, or whether other drugs are included in the regimen, and can be determined by one of skill in the art. The dosage can be adjusted by the individual physician in the event of any contraindications. Dosages can vary and can be administered in one or more dose administrations daily, for one or several days. Guidance can be found in the literature for appropriate dosages for given classes of pharmaceutical products. For example, for the given parameter, an effective amount will show an increase or decrease of at least 5%, 10%, 15%, 20%, 25%, 40%, 50%, 60%, 75%, 80%, 90%, or at least 100%. Efficacy can also be expressed as "-fold" increase or decrease. For example, a therapeutically effective amount can have at least a 1.2-fold, 1.5-fold, 2-fold, 5-fold, or more effect over a control. The exact dose and formulation will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Remington: The Science and Practice of Pharmacy, 22nd Edition, Gennaro, Editor (2012), and Pickar, Dosage Calculations (1999)).

Pharmaceutically acceptable compositions can include a variety of carriers and excipients. A variety of aqueous carriers can be used, e.g., buffered saline and the like. These solutions are sterile and generally free of undesirable matter. Suitable carriers and their formulations are described in *Remington: The Science and Practice of Pharmacy*, 22nd Edition, Loyd V. Allen et al., editors, Pharmaceutical Press (2012). By pharmaceutically acceptable carrier is meant a material that is not biologically or otherwise undesirable, i.e., the material is administered to a subject without causing undesirable biological effects or interacting in a deleterious manner with the other components of the pharmaceutical composition in which it is contained. If administered to a subject, the carrier is optionally selected to minimize degradation of the active ingredient and to minimize adverse side effects in the subject. As used herein, the term pharmaceutically acceptable is used synonymously with physiologically acceptable and pharmacologically acceptable. A pharmaceutical composition will generally comprise agents for buffering and preservation in storage and can include buffers and carriers for appropriate delivery, depending on the route of administration.

The compositions may contain acceptable auxiliary substances as required to approximate physiological conditions such as pH adjusting and buffering agents, toxicity adjusting agents and the like, for example, sodium acetate, sodium chloride, potassium chloride, calcium chloride, sodium lactate and the like. The concentration of cells in these formulations and/or other agents can vary and will be selected primarily based on fluid volumes, viscosities, body weight and the like in accordance with the particular mode of administration selected and the subject's needs.

Optionally, the NK-92 cells are administered to the subject in conjunction with one or more other treatments for the cancer being treated. Without being bound by theory, it is believed that co-treatment of a subject with NK-92 cells and another therapy for the cancer will allow the NK-92 cells and the alternative therapy to give the endogenous immune system a chance to clear the cancer that heretofore had overwhelmed such endogenous action. Optionally, two or more other treatments for the cancer being treated includes, for example, an antibody, radiation, chemotherapeutic, stem cell transplantation, or hormone therapy.

Optionally, an antibody is administered to the patient in conjunction with the NK-92 cells. Optionally, the NK-92 cells and an antibody are administered to the subject together, e.g., in the same formulation; separately, e.g., in separate formulations, concurrently; or can be administered separately, e.g., on different dosing schedules or at different times of the day. When administered separately, the antibody can be administered in any suitable route, such as intravenous or oral administration.

Optionally, antibodies may be used to target cancerous cells or cells that express cancer-associated markers. A number of antibodies have been approved for the treatment of cancer, alone.

The provided methods may be further combined with other tumor therapies such as radiotherapy, surgery, hormone therapy and/or immunotherapy. Thus, the provided methods can further include administering one or more additional therapeutic agents to the subject. Suitable additional therapeutic agents include, but are not limited to, analgesics, anesthetics, analeptics, corticosteroids, anticholinergic agents, anticholinesterases, anticonvulsants, antineoplastic agents, allosteric inhibitors, anabolic steroids, antirheumatic agents, psychotherapeutic agents, neural blocking agents, anti-inflammatory agents, antihelmintics, antibiotics, anticoagulants, antifungals, antihistamines, antimuscarinic agents, antimycobacterial agents, antiprotozoal agents, antiviral agents, dopaminergics, hematological agents, immunological agents, muscarinics, protease inhibitors, vitamins, growth factors, and hormones. The choice of agent and dosage can be determined readily by one of skill in the art based on the given disease being treated. Optionally, the additional therapeutic agent is octreotide acetate, interferon, pembrolizumab, glucopyranosyl lipid A, carboplatin, etoposide, or any combination thereof.

Optionally, the additional therapeutic agent is a chemotherapeutic agent. A chemotherapeutic treatment regimen can include administration to a subject of one chemotherapeutic agent or a combination of chemotherapeutic agents. Chemotherapeutic agents include, but are not limited to, alkylating agents, anthracyclines, taxanes, epothilones, histone deacetylase inhibitors, inhibitors of Topoisomerase I, inhibitors of Topoisomerase II, kinase inhibitors, monoclonal antibodies, nucleotide analogs and precursor analogs, peptide antibiotics, platinum-based compounds, retinoids, and vinca alkaloids and derivatives. Optionally, the chemotherapeutic agent is carboplatin.

Combinations of agents or compositions can be administered either concomitantly (e.g., as a mixture), separately but simultaneously (e.g., via separate intravenous lines) or sequentially (e.g., one agent is administered first followed by administration of the second agent). Thus, the term combination is used to refer to concomitant, simultaneous, or sequential administration of two or more agents or compositions. The course of treatment is best determined on an individual basis depending on the particular characteristics of the subject and the type of treatment selected. The treatment, such as those disclosed herein, can be administered to the subject on a daily, twice daily, bi-weekly, monthly, or any applicable basis that is therapeutically effective. The treatment can be administered alone or in combination with any other treatment disclosed herein or known in the art. The additional treatment can be administered simultaneously with the first treatment, at a different time, or on an entirely different therapeutic schedule (e.g., the first treatment can be daily, while the additional treatment is weekly).

Provided herein are kits comprising modified NK-92 cells comprising a nucleic acid encoding C-C chemokine receptor type 7 (CCR7) operably linked to a promoter. Optionally, the nucleic acid encoding CCR7 has at least 90%, 91%, 92%, 93%, 94%, 95%, 96%, 97%, 98% or 99% identity to SEQ ID NO:1. Optionally, the CCR7 is expressed on the cell surface of the modified NK-92 cells. Optionally, the modified NK-92 cell further comprises a nucleic acid encoding C-C motif ligand 21 (CCL21) operably linked to a promoter. Optionally, the nucleic acid encoding CCL21 has at least 90%, 91%, 92%, 93%, 94%, 95%, 96%, 97%, 98% or 99% identity to SEQ ID NO:2. Optionally, the modified NK-92 cell further comprises a nucleic acid encoding C-C motif ligand 19 (CCL19) operably linked to a promoter. Optionally, the nucleic acid encoding CCL19 has at least 90%, 91%, 92%, 93%, 94%, 95%, 96%, 97%, 98% or 99% identity to SEQ ID NO:16. Optionally, the promoter comprises one or more NFAT binding elements and a minimal promoter. Optionally, the promoter has at least 90%, 91%, 92%, 93%, 94%, 95%, 96%, 97%, 98% or 99% identity to SEQ ID NO:6. Optionally, the promoter drives expression of both CCL21 and CCL19. Optionally, the nucleic acid encoding CCL19 and CCL21 are linked by a 2A peptide linker, for example, SEQ ID NO:17 or 18. Optionally, the modified NK-92 cells are provided in a composition comprising a pharmaceutically acceptable excipient. Optionally, the kit may contain additional compounds such as therapeutically active compounds or drugs that are to be administered before, at the same time or after administration of the modified NK-92 cells. Optionally, instructions for use of the kits will include directions to use the kit components in the treatment of a cancer. The instructions may further contain information regarding how to prepare (e.g., dilute or reconstitute, in the case of freeze-dried protein) the antibody and the NK-92 cells (e.g., thawing and/or culturing). The instructions may further include guidance regarding the dosage and frequency of administration.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed while, specific references to each various individual and collective combinations and permutations of these compounds may not be explicitly disclosed, each is specifically contemplated and described herein. For example, if a method is disclosed and discussed and a number of modifications that can be made to a number of molecules including the method are discussed, each and every combination and permutation of the method and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the material for which they are cited are hereby specifically incorporated by reference in their entireties.

The examples below are intended to further illustrate certain aspects of the methods and compositions described herein, and are not intended to limit the scope of the claims.

EXAMPLES

Example 1. Modified NK Cell Line Expressing CCR7

Modified NK-92 cells were made by linearizing the pNKAT-CCR7-LP3 plasmid (FIG. 1) with the PflFI enzyme followed by gel purification of the linearized plasmid and then electroporating the linearized plasmid using a NEON transfection system (Thermo Fisher Scientific, Waltham, MA) on NK-92 cells. After 1 week of puromycin selection, the resulting polyclonal population was tested for CCR7 expression, and monoclonal cell lines were derived by serial dilution in X-Vivo™ media (Lonza, Basel, Switzerland) supplemented with 5% human serum and IL-2. Improved selection was observed with the addition of 25% conditioned media (sterile filtered supernatant from the polyclonal population). The modified NK-92 cells contained the EF1a promoter, CCR7 Gene with Poly-Atail, and the LoxP flanked puromycin resistance gene driven by the ubiquitin promoter all encased in homology arms targeting the AAVS1 locus (SEQ ID NO:7). The sequences used in the examples and discussed throughout the specification are shown in Table 1.

Figure 3:
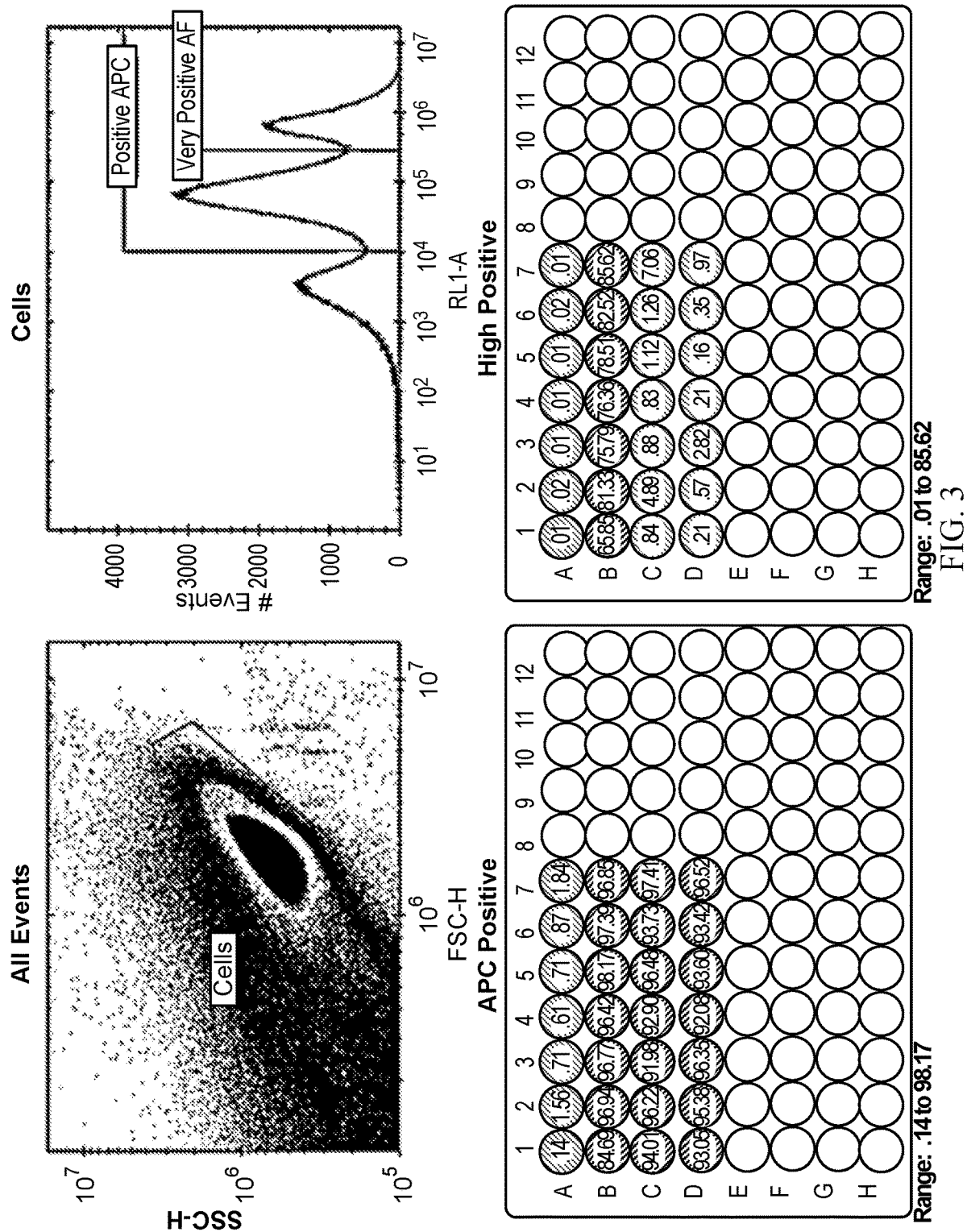
FIG. 3 are graphs showing expression of phenotypic markers associated with NK-92 cells in wild type NK-92 cells and modified NK-92 cells expressing CCR7. (Lane 1: aNK (Wild Type); Lane 2: Modified NK-92 cells (MA3); Lane 3: Modified NK-92 cells (MB4); Lane 4: Modified NK-92 cells (MB6); Lane 5: Modified NK-92 cells (ME6); Lane 6: Modified NK-92 cells (MH3); A: Isotype (APC); B: CD54(ICAM-1); C: NKp30; D: NKG2D).

To verify expression of CCR7 does not affect NK-92 cells, 2 expression of markers of NK-92 cells was determined. The results are shown in FIG. 3. All data in FIG. 3 was generated using an Intellicyt iQue screener plus. Cells were incubated at 4° C. for 30 minutes with either APC conjugated antibody against the described phenotypic marker, or appropriate isotype as negative control. Cells were then rinsed in PBS +1% BSA, pelleted, and re-suspended in 30 uL of PBS +1% BSA. The readout was then gated as shown in the upper left quadrant to eliminate cellular debris from the readings, and the percentage of cells above the fluorescence thresholds shown in the upper right quadrant were then displayed as two separate heatmaps, showing the percentage above the "positive" threshold, and the "very positive" threshold in the lower left and lower right quadrants respectively. FIG. 3 shows that driving expression of CCR7 does not meaningfully affect the primary phenotypic markers associated with our cell lines. Specifically, CCR7 expression does not appear to affect NKp30 or NKG2D expression and may slightly increase ICAM-1 expression.

Figure 4:
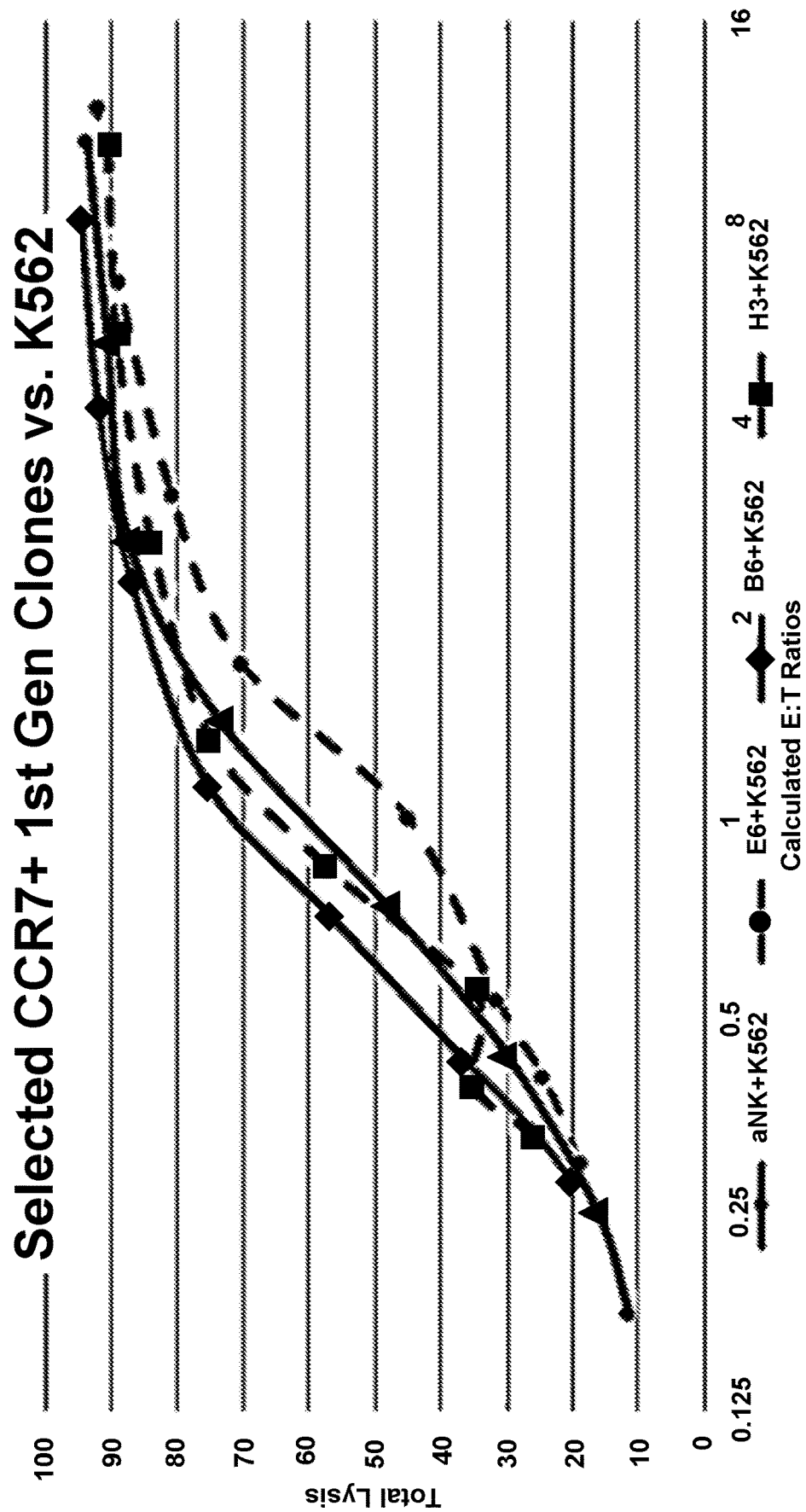
FIG. 4 is a graph showing cytoxic activity of modified NK-92 cells expressing CCR7 against K562 cells.
Figure 5:
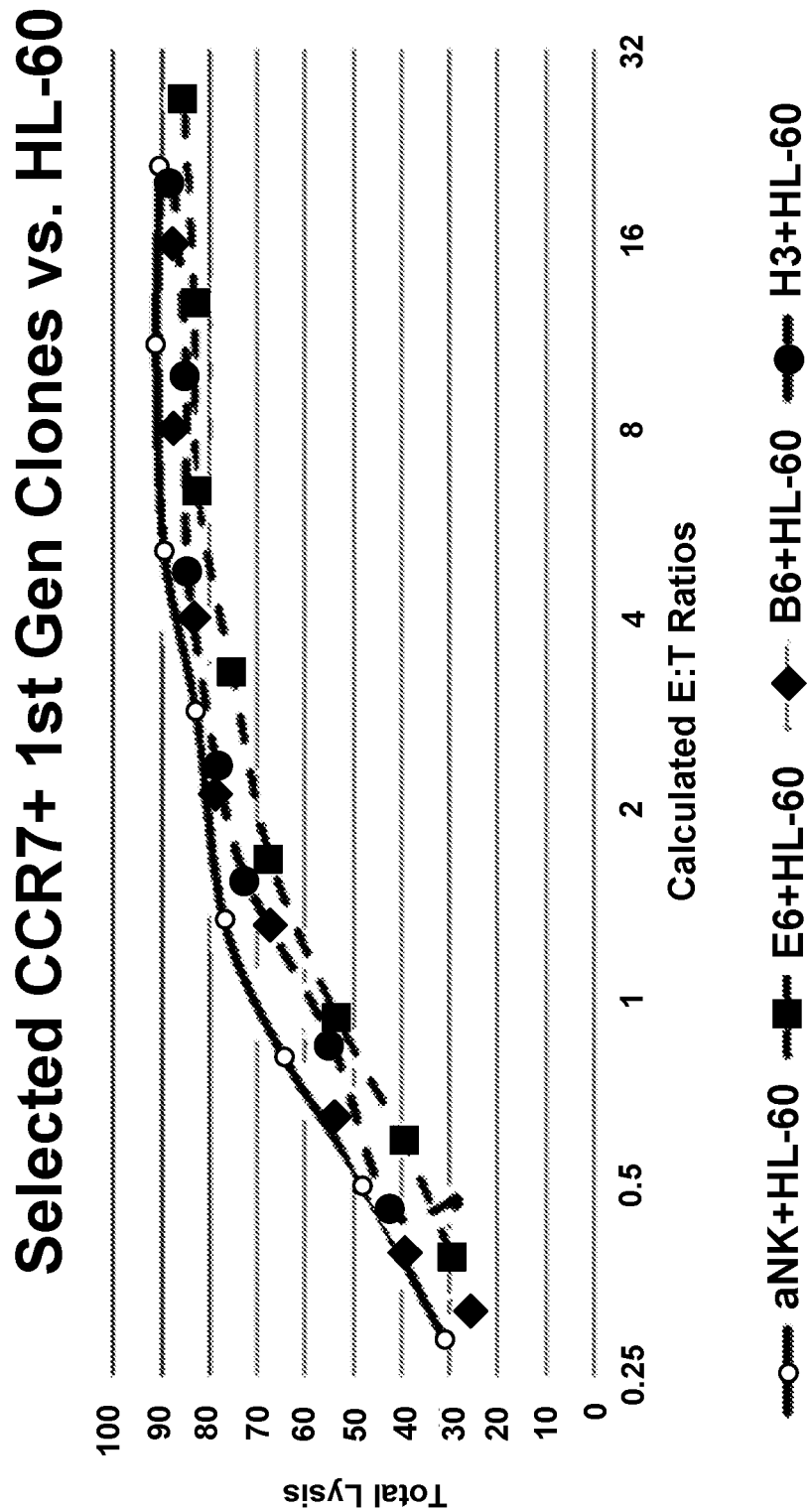
FIG. 5 is a graph showing cytoxic activity of modified NK-92 cells expressing CCR7 against HL-60 cells.

To determine cytotoxicity of the modified NK-92 cells, effector cells (Nk-92 cells and modified NK-92 cell clones) were seeded into the left wells of a 96-well V-bottom plate (turned sideways), and then serially diluted across the plate, with 100 k effectors left in the highest concentration well, and with 7 further 2-fold dilutions across the 8 rows of the plate. Stained target cells (K562 (FIG. 4), HL-60 (FIG. 5) were then seeded at 10 k/well in all wells containing effectors, along with control wells of just targets to measure background death. The plate was then briefly spun down and incubated at 37° C. and 5% C02 for 4 hours. The plate was then spun down, the supernatant aspirated off, and the cells re-suspended in PBS containing propidium iodide to measure cell death. The cells were then run through an Intellicyt iQue screener plus, and the proportion of target cells (differentiated from effectors by their stain) which are also positive for PI staining was measured. At this time a "real" effector to target ratio was also calculated representing the number of effector and target cells counted by the iQue. The percentage of dead cells was then compared against the number of naturally dying cells in the control wells, and a percentage of cells that are specifically killed by the effectors was calculated. The results are shown in FIGS. 4 and 5. FIG. 4 shows comparable cytotoxicity in CCR7 upregulated clones as compared to parental cell line vs. K562 cells and FIG. 5 shows comparable cytotoxicity in CCR7 upregulated clones as compared to parental cell line vs. HL-60 cells.

Figure 7:
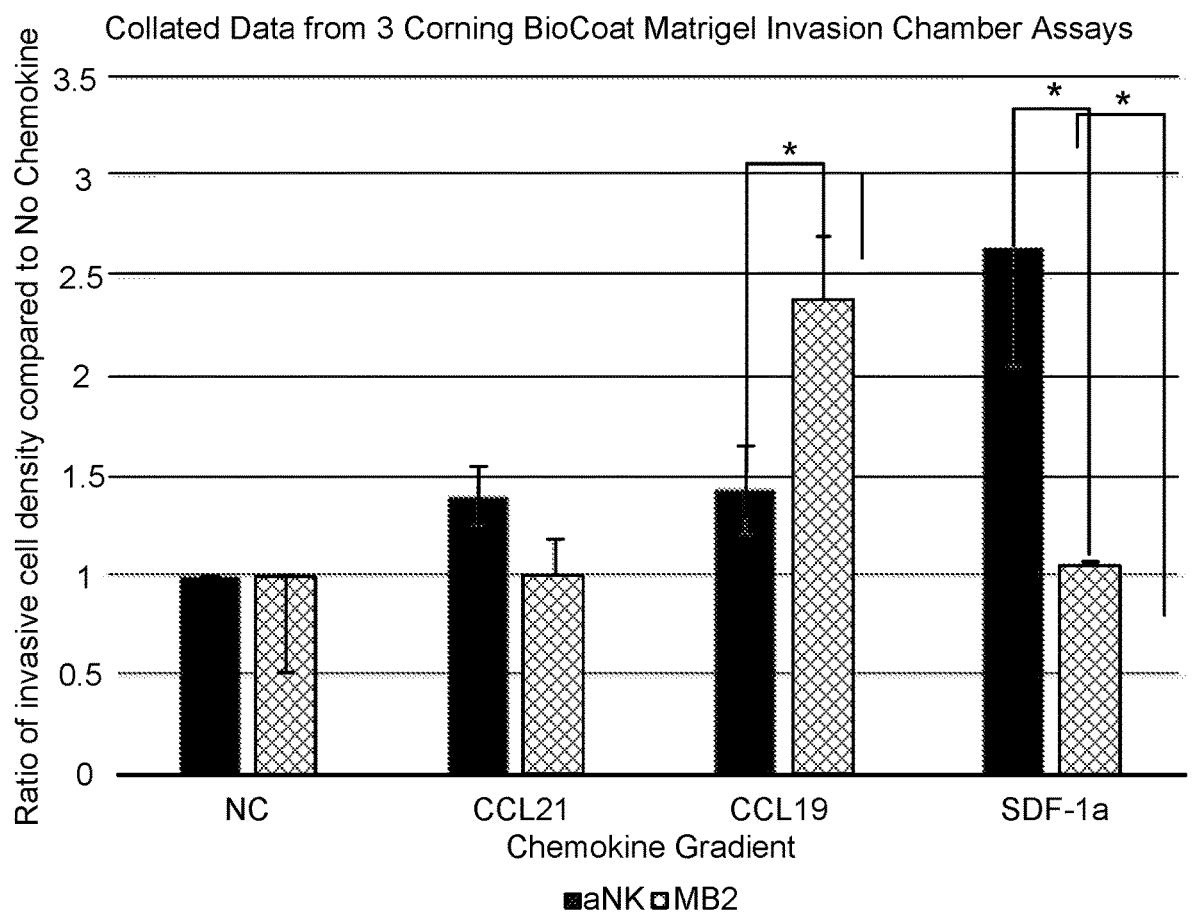
FIG. 7 is a graph showing modified NK-92 cells expressing CCR7 migrated towards the chemokines CCL19 and CCL21.

In vitro testing consisted of using Boyden chamber assays and a Matrigel layer to block migration. The modified cells expressing CCR7 showed migration towards CCL21 and CCL19 (an alternate CCR7 ligand) in these assays. Cells were placed in an upper well, and separated from a lower chamber by a thin layer of Matrigel (an ECM-like substrate) coated on 8 uM pores. The cells (25 k/well) were placed in the upper chamber, in reduced-serum media (X-Vivo 10+1% Human Serum+500 U/mL IL-2), and the same reduced serum medium was used in the lower chamber, either by itself or containing a chemokine of interest. In this case, CCL21 was used at 15 ng/mL, CCL19 was used at 15 ng/mL, and SDF-1a was used at 20 ng/mL. Each test was done in triplicate for either Nk-92 cells or modified NK-92 cells expressing CCR7. The plate was then placed in the incubator overnight for an 18 hour invasion assay, after which the upper chambers were removed, and 150 µL (of 750 µL total volume) was sampled from the lower well after thorough mixing and read on a MacsQuant FACS analysis machine. Live cells in the lower chamber were counted, and the number of cells was then compared against the wells containing no chemokine and an invasiveness index number was generated. These numbers were averaged and statistical relevance calculated using a two-tailed t-test. As the lower well was sampled without any detachment of cells from the lower membrane, those cells still attached to the lower portion of the ECM would not be represented in these numbers, likely resulting in the differences between CCL19 and CCL21. The results are shown in FIG. 7. Specifically, FIG. 7 shows statistically significant increases in invasiveness of modified NK-92 cells expressing CCR7 towards CCL19, a CCR7 chemokine. It also shows a decrease in invasiveness towards SDF-1a, a chemokine involved in bone marrow metastasis, likely a response to upregulation of the CCR7 receptor. The lack of a statistically significant response to CCL21 is likely due to the nature of the assay performed. The assay measures both invasion and subsequent detachment from the ECM, a behavior consistent with CCL19 gradient migration. CCL21, while inducing migration, does not induce detachment from the matrix, requiring an additional step to demonstrate statistically significant invasive potential.

Figure 8:
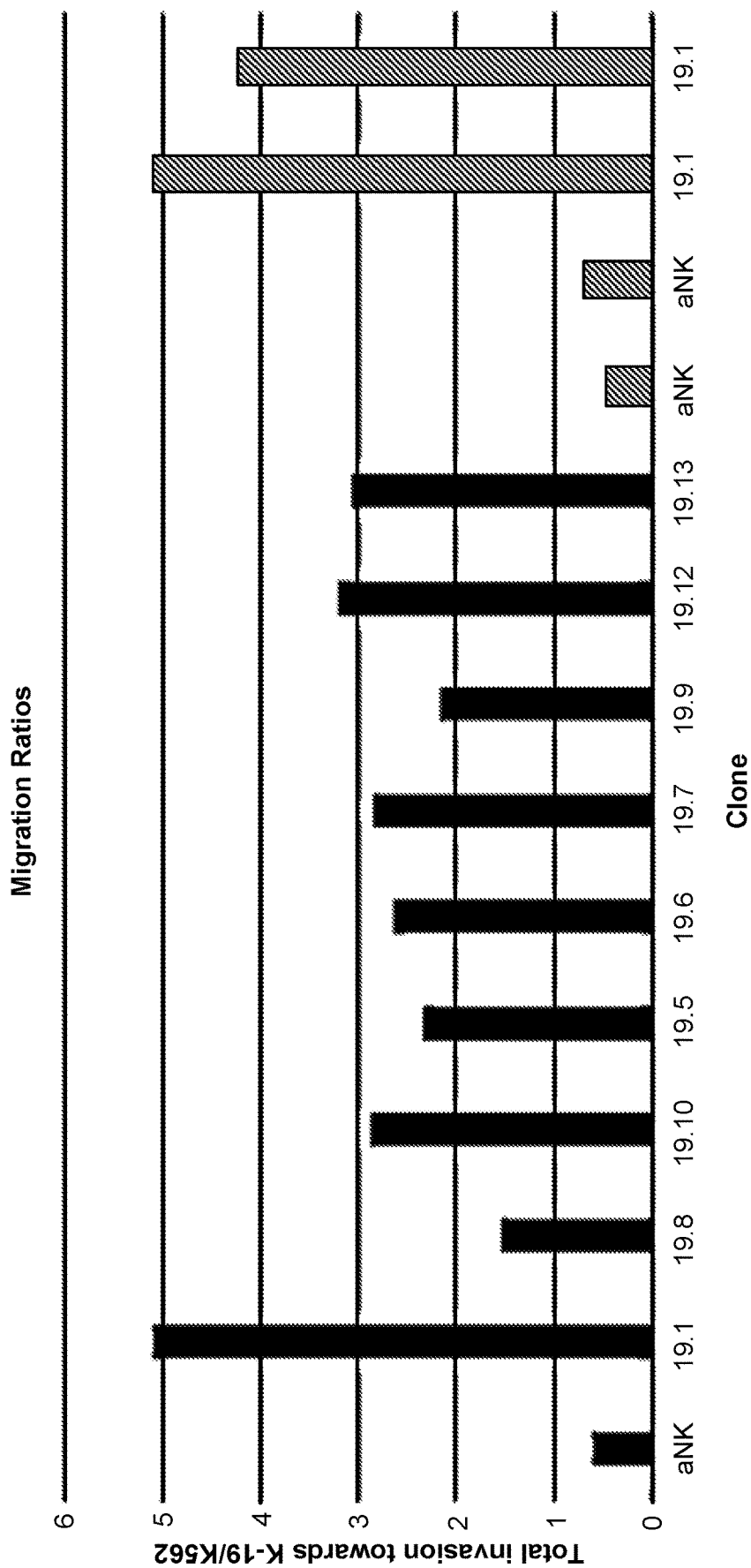
FIG. 8 is a graph showing cells expressing CCR7 migrate towards K-19 cells expressing CCL19.

The ability of various modified NK-92 cell clones expressing CCR7 (alongside NK-92 wild type control referred to as aNK in FIG. 8) to migrate towards cells engineered to express the human chemokine CCL19 (K-19 cells) was assessed. Cell recruitment towards wild type cells of the same type (K562) was also determined. Invasion assays were performed using Corning Biocoat Transwell assays with carboxyfluorescein succinimidyl ester (CFSE) stained effectors. The bottom well of the Transwell was incubated with either wild type K562 or K-19, a K562 variant engineered to express CCL19, the number of invasive cells in the K-19 wells were then compared against the number of invasive cells in the K562 wells by flow cytometry. The results are shown in FIG. 8. NK-92 cells expressing CCR7 migrate towards K-19 cells.

Figure 9A:
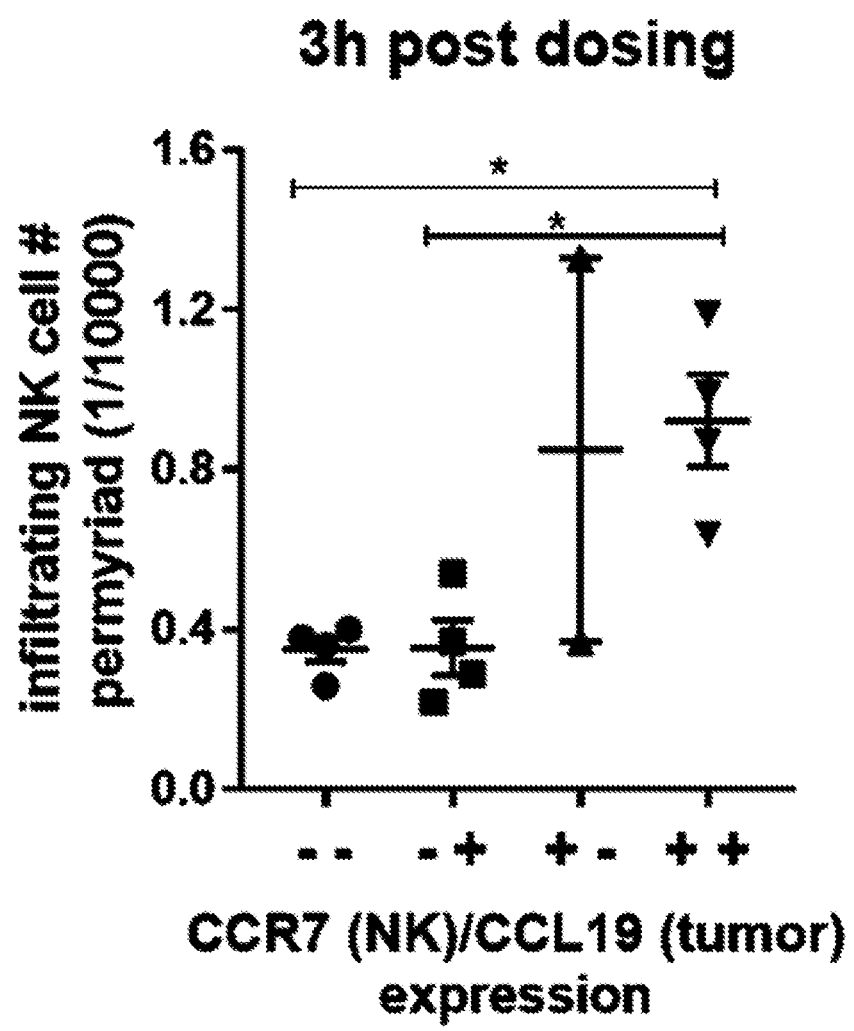
FIGS. 9A and 9B are graphs showing in vivo analysis of CCR7 migration.
Figure 9B:
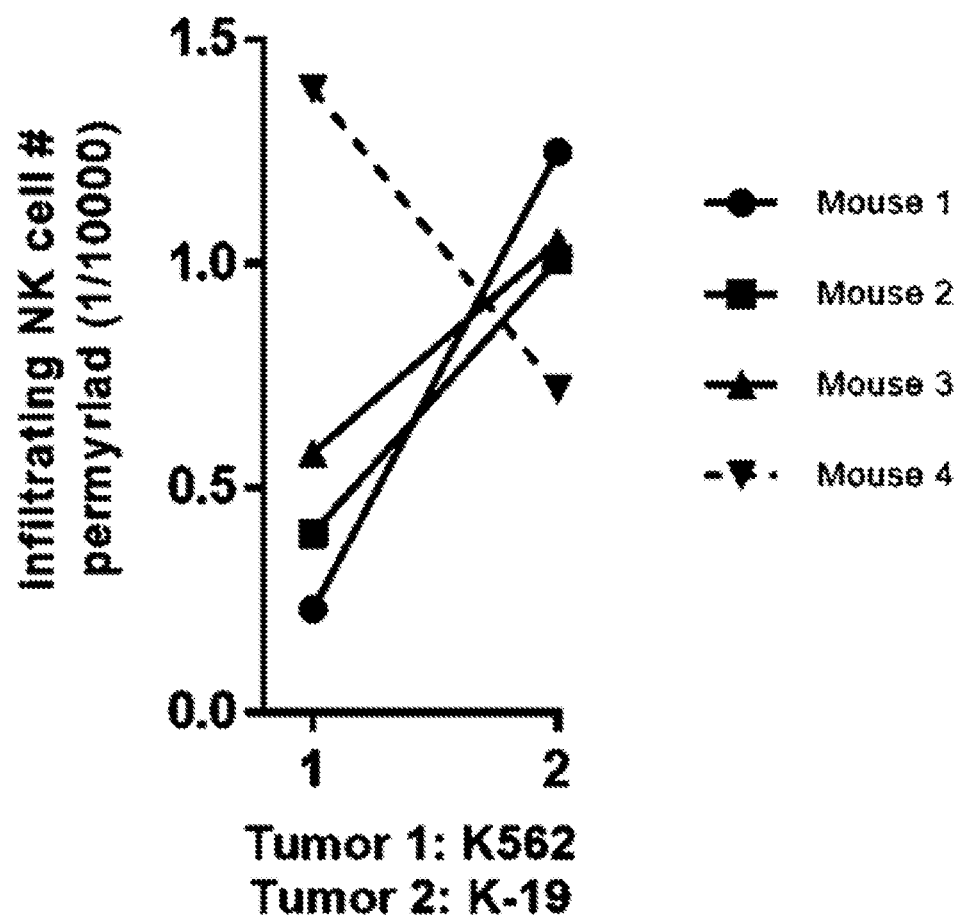

In vivo study of CCR7 distribution was done by initiating contralateral tumors on NSG mice, K562 on one flank, and K-19 (K562 engineered to express CCL19) on the other. Effector cells were CFSE stained, and then dosed via tail vein injection. Tumors were harvested at various time points and the number of CFSE-stained infiltrating effectors was counted by creating a single cell suspension of tumor cells and then running on a flow cytometer. FIG. 9A shows the number of accumulating cells in all cohorts at 3 hours after injection, demonstrating significant improvement of homing to tumors arising with a CCL19 source when dosed with effectors equipped with the CCR7 receptor. FIG. 9B shows increased recruitment to tumors secreting CCL19 in three out of four mice from the CCR7+ cohort at 24 hours.

Figure 10:
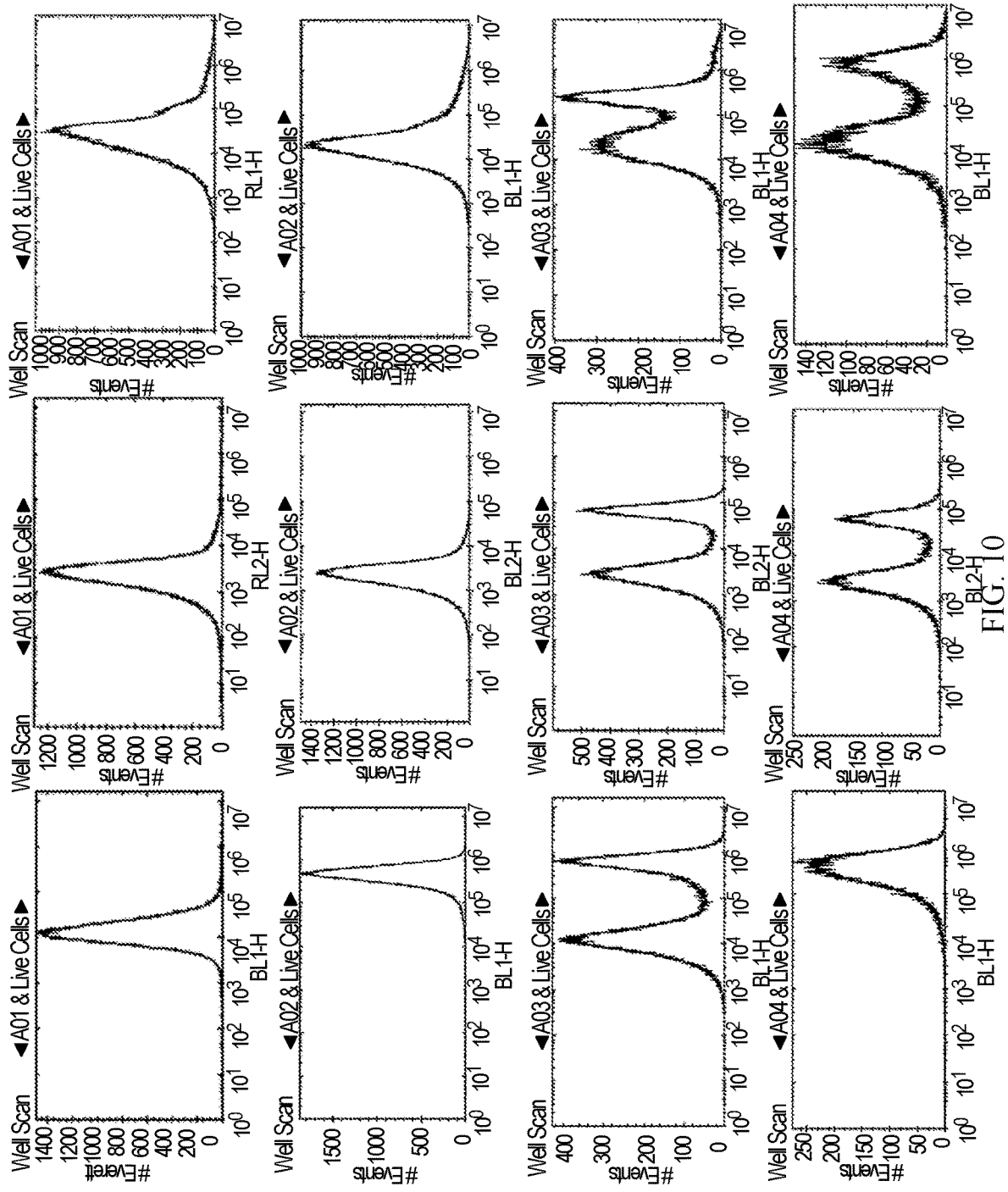
FIG. 10 is a graph showing detection of CCR7, CD16 or CD19 in NK-92 cells modified to express CCR7 (row 2), CCR7 and CD16 (row 3) or CCR7, CD16 and CD19 (row 4). Wild type NK-92 cells are control in row 1.

NK-92 cells expressing CCR7 are also able to express Fc receptors and CARs. Staining of wild type NK-92 cells alongside three variants with the CCR7 receptor was performed. The results are shown in FIG. 10. The first row of FIG. 10 shows staining of the wild type cells for CCR7, CD16, and a CD19 CAR, which are all negative baseline. The second row shows cells expressing only CCR7. The third row shows cells expressing CCR7 and CD16 (which also shows some positivity by Protein L staining due to human serum derived IgG). The fourth row shows cells expressing CCR7, CD16, and a CD19 CAR (with positive Prot. L staining).

Example 2. Generation of NFAT Responsive Construct for Controlled Expression of CCL21

Figure 6A:
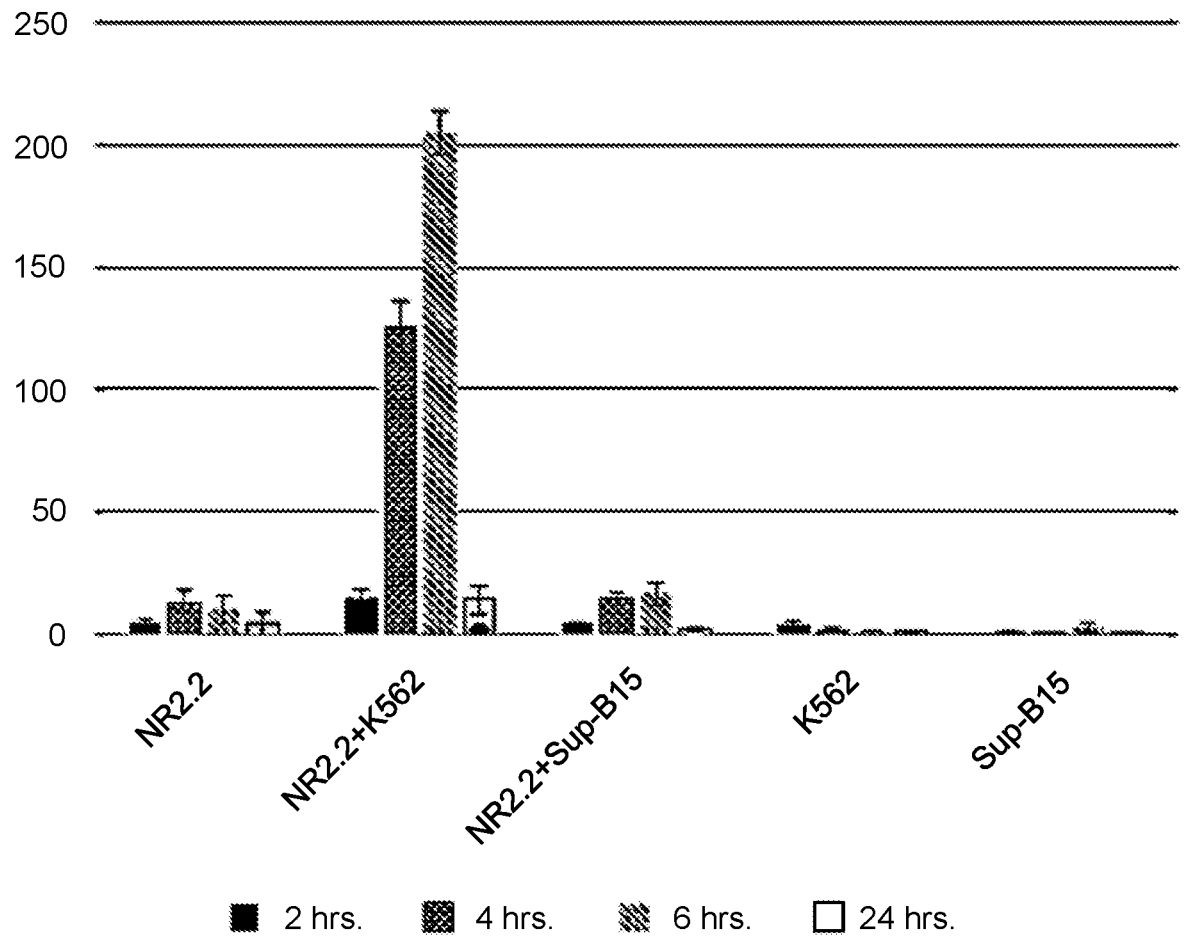
FIGS. 6A and 6B are graphs showing NFAT activation demonstrated in the context of target binding to K562 and Sup-B15 (when cells were electroporated with mRNA for a CD19-CAR).
Figure 6B:
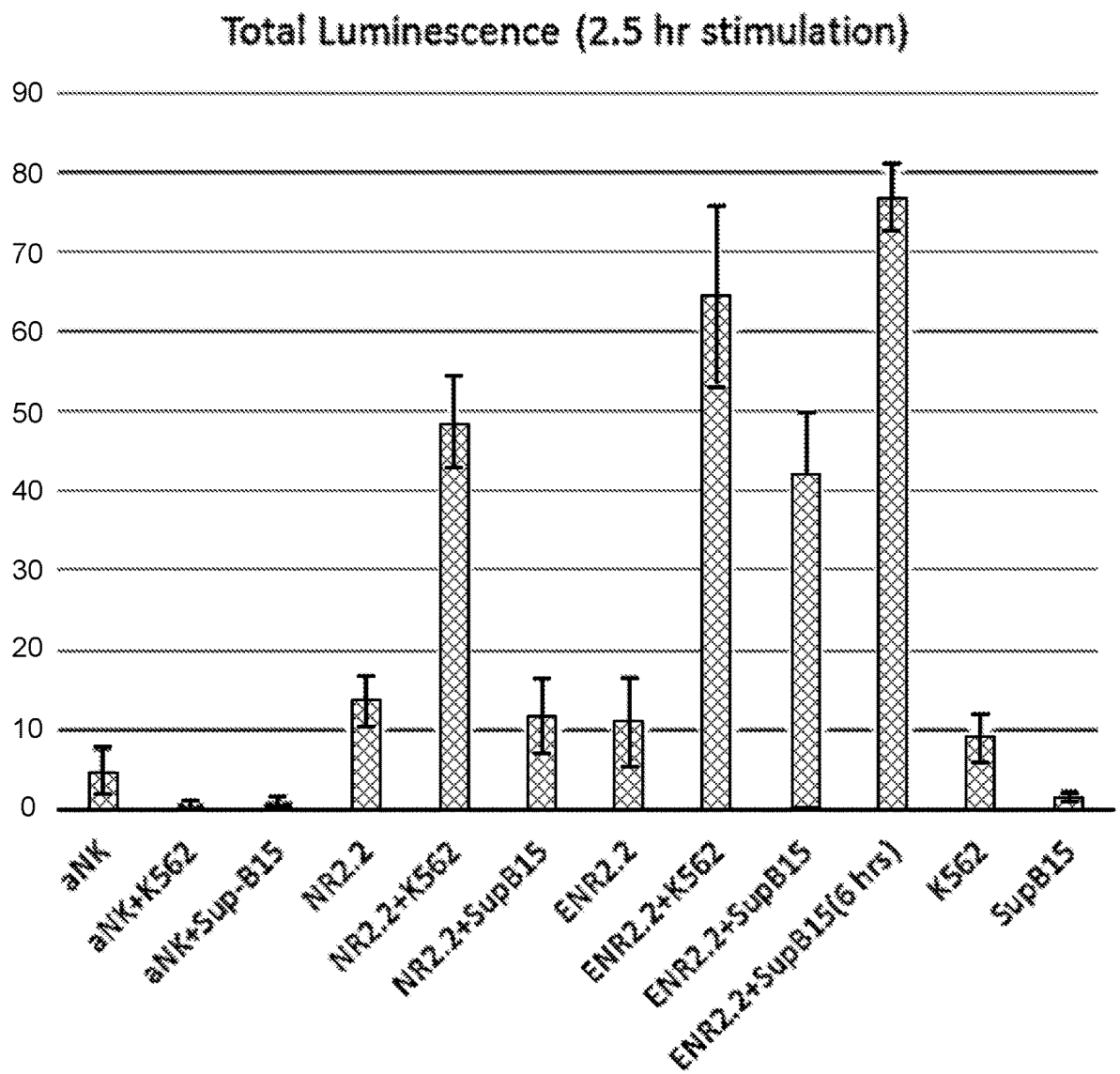

To identify an NFAT responsive element, a cell line stably expressing an NFAT-based Luciferase expression cassette (NR2.2) was created by electroporating a linearized construct into Nk-92 cells which contains a stop region, followed by 3 NFAT response elements (SEQ ID NO:4), and a minimal promoter (SEQ ID NO:5), which in the presence of activated NFAT will thus drive the production of Firefly Luciferase. A subset of these cells were then also electroporated with mRNA containing an anti-CD19 CAR (an antigen present on Sup-B15 cells, otherwise resistant to killing by NK-92 cells). These cells are represented in the left graph as ENR2.2. The cells were then plated in triplicate in the absence or presence of target cells, and incubated for periods ranging from 2.5 hours to 24 hours. At the end of the incubation period, the Step 1 reagent from a Promega DualGlo system was added to the wells to activate luciferase (by providing its substrate, luciferin). The result was then read on a SpectraMax i3x plate reader, and presented as an average with standard deviation as calculated in Microsoft Excel. The results are shown in FIGS. 6A and 6B. NFAT activation was demonstrated in the context of target binding to K562 in a time-dependent manner and to Sup-B15 but only when electroporated with mRNA for a CD19-CAR Example 3. Modified NK Cell Line Expressing CCR7 and CCL21

The pCRENFAT-CCL21 plasmid is incorporated into the NK-92 cells containing CCR7 using the LoxP sites embedded in the pNKAT-CCR7-LP3 construct in a recombinase mediated cassette exchange. Following electroporation of the circular plasmid (pCRENFAT-CCL21), Cre Recombinase is transiently expressed mediating the exchange of the new LoxP-flanked cassette for the old selection cassette. Selection in Blasticidin is used to favor the incorporation of the new cassette, and monoclonal cell lines are sub-cloned from the resulting population in the same manner as previously described in Example 1 to obtain modified NK-92 cells expressing CCR7 and CCL21.

To evaluate Modified NK-92 cells expressing CCR7 and CCL21, unstained modified NK-92 cells are co-cultured in the lower well of a Boyden chamber with cells known to cause NFAT activation (K562 or other cell line) and stained modified NK-92 cells are placed in the upper chamber. If migration is demonstrated to be induced by co-culture with sensitive cell lines, then this system is working.

For a supplementary in vivo assay, the migration portion is tested by using CCL21 secreting target cells embedded in a Matrigel plug. The target cells are used to form a small tumor in a syngeneic or NSG mouse model, and subsequently the engineered effector cells given to the mouse by a different route (e.g., by subcutaneous versus tail vein). If the cells preferentially migrate towards cells secreting an appropriate chemotactic ligand, this demonstrates the modified cells are targeted to the cancer cells.

TABLE 1

Sequences.

| | |
|---|---|
| SEQ ID NO: 1 CCR7 Sequence (modified from OriGene CCR7 cDNA to remove a mutation, much of the 5'UTR, and improve the Kozak Sequence) | gccaccatgaaaagcgtgctggtggtggctctccttgtcattttccaggtatgcctgtgtcaagatgaggt cacggacgattacatcggagacaacaccacagtggactacaattgttcgagtctttgtgctccaagaag gacgtgcggaacttttaaagcctggttcctccctatcatgtactccatcatttgtttcgtgggcctactgggca atgggctggtcgtgttgacctaatctatttcaagaggctcaagaccatgaccgatacctacctgctcaac ctggcggtggcagacatcctatcctcctgaccatccatctgggcctacagcgcggccaagtcctggg tcttcggtgtccactatgcaagctcatctttgccatctacaagatgagcttatcagtggcatgctcctacttc tttgcatcagcattgaccgctacgtggccatcgtccaggctgtctcagctcaccgccaccgtgcccgcgt ccttctcatcagcaagctgtcctgtgtgggcatctggatactagccacagtgctctccatcccagagctcc tgtacagtgacctccagaggagcagcagtgagcaagcgatgcgatgctctctcatcacagagcatgtg gaggcctttatcaccatccaggtggcccagatggtgatcggctttctggtcccctgctggccatgagctt ctgttaccttgtcatcatccgcaccctgaccaggcacgcaactttgagcgcaacaaggccatcaaggtg atcatcgctgtggtcgtggtcttcatagtcttccagctgccctacaatggggtggtcctggcccagacggt ggccaacttcaacatcaccagtagcacctgtgagctcagtaagcaactcaacatcgcctacgacgtcac ctacagcctggcctgcgtccgctgctgcgtcaaccctttcttgtacgccttcatcggcgtcaagttccgca acgatctcttcaagctcttcaaggacctgggctgcctcagccaggagcagctccggcagtggtcttcctg tcggcacatccggcgctcctccatgagtgtggaggccgagaccaccaccaccttaccccatag |

TABLE 1-continued

Sequences.

| | |
|---|---|
| SEQ ID NO: 2<br>CCL21 Sequence | accgccatggctcagtcactggctctgagcctccttatcctggttctggcctaggcatcccaggaccca<br>aggcagtgatggaggggctcaggactgttgcctcaagtacagccaaaggaagattcccgccaaggttg<br>tccgcagctaccggaagcaggaaccaagataggctgctccatcccagctatcctgttatgccccgca<br>agcgctctcaggcagagctatgtgcagacccaaaggagctctgggtgcagcagctgatgcagcatctg<br>gacaagacaccatcccacagaaaccagcccagggctgcaggaaggacagggggcctccaagac<br>tggcaagaaaggaaagggctccaaaggctgcaagaggactgagcggtcacagaccccttaa |
| SEQ ID NO: 3 EF1a<br>Promoter Sequence | gctccggtaccgtcagtaaacagagcacacatcgcccacagtccccaagaagttggggggaggg<br>tcggcaattgaaccggtgcctagaaaaggtggcacggggtaaactaggaaagtaatgtcgtgtactgg<br>ctccgccttttttcccgagggtggggagaaccgtatataagtgcagtagtcgccgtgaacgttcttttcg<br>caacgggtttgccgccagaacacaggtaagtgccatgtgtggttcccgcgggcctggcctcttttacggg<br>ttatggcccttgcgtgccttgaattacttccacctggctgcagtacgtgattcttgatcccgagcttcgggtt<br>ggaagtgggtgggagagttcgaggccttgcgcttaaggagccccttcgcctcgtgcttgagttgaggcc<br>tggcctgggcgctggggccgccgcgtgcgaatctggtggccaccttcgcgcctgtctcgctgctttcgat<br>aagtctctagccatttaaaattttttgatgacctgctgcgacgctttttttctggcaagatagtcttgtaaatgcg<br>ggccaagatctgcacactggtatttcggttttttggggccgcgggcggcgacggggcccgtgcgtccca<br>gcgcacatgttcggcgaggcggggcctgcgagcgcggccaccgagaatcggacgggggtagtctca<br>agctggccggcctgactggtgcctggcctcgcgccgccgtgtatcgccccgccctgggcggcaagg<br>ctggcccggtcggcaccagttgcgtgagcggaaagatggccgcttcccggccctgctgcagggagct<br>caaaatggaggacgcggcgctcggagagcgggcgggtgagtcacccacacaaaggaaaaggc<br>ctttccgtcctcagccgtcgcttcatgtgactccacggagtaccgggcgccgtccaggcacctcgattag<br>ttctcgagcttttggagtacgtcgtctttaggttgggggaggggttttatgcgatggagtttccccacact<br>gagtgggtggagactgaagttaggccagcttggcacttgatgtaattctccttggaatttgccctttttgagt<br>ttggatcttggttcattctcaagcctcagacagtggttcaaagttttttttcttccatttcaggtgtcgtga |
| SEQ ID NO: 4 NFAT<br>Response Element<br>Sequence (Binding<br>site for activated<br>NFAT) | GGAGGAAAAACTGTTTCATACAGAAGGCGT |
| SEQ ID NO: 5<br>Minimal Promoter<br>(Downstream of 3<br>NFAT Response<br>Elements) | TAGAGGGTATATAATGGAAGCTCGAATTCCAG |
| SEQ ID NO :6<br>Complete NFAT<br>Response Cassette<br>(Poly-A+Pause site<br>followed by 3 NFAT<br>R.E. followed by<br>Minimal Promoter) | aataaaatatctttatttcattacatctgtgtgttggtttttgtgtgaatcgatagtactaacatacgctctcca<br>tcaaaacaaaacgaaacaaaacaaactagcaaaataggctgtccccagtgcaagtgcaggtgccaga<br>acatttctctggcctaactggccggtacctgagctcgctagcggaggaaaaactgtttcatacagaaggc<br>gtggaggaaaaactgtttcatacagaaggcgtggaggaaaaactgtttcatacagaaggcgtagatcta<br>gactctagagggtatataatggaagctcgaattccag |
| SEQ ID NO: 7<br>Complete Sequence<br>of Initial Insertion<br>(EF1a promoter,<br>CCR7 Gene with<br>Poly-A, and LoxP<br>flanked Puromycin<br>Resistance gene<br>driven by the<br>Ubiquitin promoter<br>all encased in<br>homology arms<br>targeting the AAVS1<br>locus) | aggtcctactactctgacctgcattctctcccctgggcctgtgccgctttctgtctacagcttgtggcctgg<br>gtcacctctacggctggcccagatcctccctgccgcctccttcaaattccgtcttcctccactccctcttcc<br>ccttgctctctgctgtgttgctgcccaaggatgctattccggagcacttccttctctggcgctgcaccacgt<br>gatgtcctctgagcggatcctcccgtgtctgggtcctctccgggcatctctcctccctcacccaaccca<br>tgccgtcttcactcgctgggttccctttttcatctccttctggggcctgtgccatctctcgtttcttaggatggc<br>cttaccgacggatgtctcccttgcgtcccgcctcccttcttgtaggcctgcatcatcaccgttttttctgga<br>caacccaaagtacccccgtctccctggctttagccacctctccatcctcttgctttcttttggcacaccc<br>cgttctcctgctggattcgggtcacctctcactccttttcatttgggcagctcccctacccccccttacctctctag<br>tctgtgctagctctccagcccctgtcatggcatcttccaggggtccgagagctcagctagtcttcttcct<br>ccaacccgggcccctatgtccacttcaggacagcatgtttgctgcctccagggatcctgtgtccccgagc<br>tgggaccacttatattcccagggccggttaatgtggctctggctctgggtacttttatctgtcccctccacc<br>ccacagtggggtacctctagagctgaccaaaagaccaccaaaggcgccttgacccttcagccccctacct<br>gcgctccggtgcccgtcagtgggcagagcgcacatcgcccacagtccccgagaagttgggggagg<br>ggtcggcaattgaaccggtgcctagaaaggtggcgcggggtaaactgggaaagtgatgtcgtgtact<br>ggctccgccttttttcccgagggtggggagaaccgtatataagtgcagtagtcgccgtgaacgttctttt<br>cgcaacgggtttgccgccagaacacaggtaagtgccgtgtgtggttcccgcgggcctggcctcttttacg<br>ggttatggcccttgcgtgccttgaattacttccacctggctgcagtacgtgattcttgatcccgagcttcgg<br>gttggaagtgggtgggagagttcgaggccttgcgcttaaggagccccttcgcctcgtgcttgagttgag<br>gcctggcctgggcgctggggccgccgcgtgcgaatctggtggccaccttcgcgcctgtctcgctgcttt<br>cgataagtctctagccatttaaaattttttgatgacctgctgcgacgctttttttctggcaagatagtatgtaaat<br>gcgggccaagatctgcacactggtatttcggttttttggggccgcgggcggcgacggggcccgtgcgtc<br>ccagcgcacatgttcggcgaggcggggcctgcgagcgcggccaccgagaatcggacgggggtagt<br>ctcaagctggccggcctgctctggtgcctggcctcgcgccgccgtgtatcgccccgccctgggcggca<br>aggctggcccggtcggcaccagttgcgtgagcggaaagatggccgcttcccggccctgctgcaggga<br>gctcaaaatggaggacgcggcgctcggagagcgggcgggtgagtcacccacacaaaggaaaagg<br>cctttccgtcctcagccgtcgatcatgtgactccacggagtaccgggcgccgtccaggcacctcgatt<br>agttctcgagatttggagtacgtcgtctttaggttgggggagggggttttatgcgatggagtttccccaca<br>ctgagtgggtggagactgaagttaggccagcttggcacttgatgtaattctccttggaatttgccctttttga<br>gtttagatcttggttcattcaagcctcagacagtggttcaaagttttttacttccatttcaggtgtcgtgataa<br>tacgactcactatagggagacccaagaggaattcggcggccgccaccatgaaagcgtactggtggt<br>ggctctccttgtcatttttccaggtatgcctgtgtcaagatgaggtcacggacgattacatcggagacaaca<br>ccacagtggactacactttgttcgagtattatgaccaagaaggacgtgcggaactttaaagcctggttc<br>ctccctatcatgtgactccatcatttgtttcgtgggcctactgggcaatggctggtcgtattgacctatatcta |

TABLE 1-continued

Sequences.

```
tttcaagaggctcaagaccatgaccgatacctacctgctcaacctggcggtggcagacatcctatcctc
ctgaccttccatagggcctacagcgcggccaagtcctgggtcttcggtgtccacttttgcaagctcat
ctttgccatctacaagatgagcttcttcagtggcatgctcctacttctttgcatcagcattgaccgctacgt
gccatcgtccaggctgtctcagctcaccgccaccgtgcccgcgtccttctcatcagcaagctgtcctgtg
tgggcatctggatactagccacagtgactccatcccagagctcctgtacagtgacaccagaggagca
gcagtgagcaagcgatgcgatgctctctcatcacagagcatgtgaggcctttatcaccatccaggtgg
cccagatggtgatcggctttctggtcccctgctggccatgagcttctgttaccttgtcatcatccgcaccc
tgctccaggcacgcaactttgagcgcaacaaggccatcaaggtgatcatcgctgtggtcgtggtcttcat
agtcttccagctgccctacaatggggtggtcctggcccagacggtggccaacttcaacatcaccagtag
cacctgtgagctcagtaagcaactcaacatcgcctacgacgtcacctacagcctggcctgcgtccgctg
ctgcgtcaaccctttcttgtacgccttcatcggcgtcaagttccgcaacgatctcttcaagctcttcaagga
cctgggctgcctcagccaggagcagctccggcagtggtcttcctgtcggcacatccggcgctcctccat
gagtgtggaggccgagaccaccaccaccttctccccataggcggccgcggtcatagctgtttcctgaac
agatcccgggtggcatccctgtgacccctcccagtgcctctcctggccctggaagttgccactccagt
gccaccagccttgtcctaataaaattaagttgcatcatatgtctgactaggtgtccttctataatattatggg
gtggaggggggtggtatggagcaaggggcaagttgggaagacaacctgtagggcctgcggggtctat
tgggaaccaagctggagtgcagtggcacaatcttggctcactgcaatctccgcctcctgggttcaagcg
attctcctgcctcagcctcccgagttgttgggattccaggcatccatgaccaggctcagctaatttttgtttt
ttggtagagacgggtttcaccatattggccaggctggtctccaactcctaatctcaggtgatctacccac
cttggcctcccaaattgctgggattacaggcgtgaaccactgctcccttccctgtccttctgattttaaaata
actataccagcaggaggacgtccagacacagcataggctacctggccatgcccaaccggtggggacatt
tgagttgcttgcttggcactgtcctctcatgcgttgggtccactcagtagatgcctgttgaattgggtacgc
ggccagcttaatgcataacttcgtataatgtatgctatacgaagtttatgttaattaagggtgcagcggcctc
cgcgccgggttttggcgcctcccgcgggcccccccctcctcacggcgagcgctgccacgtcagacga
agggcgcaggagcgttcctgatccttccgcccggacactcaggacaacgcccactgctcataagact
cggccttagaacccagtatcagcagaaaaacattttaggacaggacttaaatgactctaaaacactgg
ttttcttttccagagaacggaacaggcgaggaaaaatagtccatctcggcgattctacggagggatctcc
gtggggcggtgaacgccgatgattatataaggacgcgccgggtgtggcacagctagttccgtcgcagc
cgggatttgggtcacggttcttgtttgtggatcgctgtgatcgtcacttggtgagttgcgggcgtgctgggct
ggccggaactttcgtggccgccgggccgctcggtgggacggaagcgtgtggagagaccgccaagg
gctgtagtctgggtccacgagcaaggttgccctgaactggggtgtggggggagcacacaaatggcg
gctgttcccgagtcttgaatggaagacgcttgtaaggcgggctgtgaggtcgttgaaacaaggtgggg
gcatggtgggcggcaagaacccaaggtcttgaggccttcgctaatgcgggaaagctcttattcgggtga
gatgggctggggcaccatctggggaccctgacgtgaagtttgtcactgactggagaactcgggtttgtc
gtctggttgcggggcggcagttatgcggtgccgttgggcagtgcacccgtacattgggagcgcgcg
cctcgtcgtgtcgtgacgtcaccgttctgttggcttataatgcagggtggggccacctgccggtaggtgt
gcggtaggcttttctccgtcgcaggacgcagggttcgggcctagggtaggtctcctgaatcgacaggc
gccggacctctggtgagggagggataagtgaggcgtcagttctttggtcggttttatgtacctatcttct
taagtagctgaagctccggttttgaactatgcgctcggggttggcgagtgtgttttgtgaagttttttaggca
ccttttgaaatgtaatcatttgggtcaatatgtaattttcagtgttagactagtagtaaatttgtccgctaaattagg
cgttttttggcttttttgttagacgaagcttgggctgcaggtcgactctagtgtaacgccaccatgaccgag
acaagcctaccgtgaggctggccaccccgggacgacgtgcccagaccgtgaggacactggccgcc
gccttcgccgactaccccgccaccccggcacaccgtggaccccgaccggcacatcgagcgggtgacc
gagctgcaggaacttgttcctgaccagagtgggcctggatatcggcaaagtgtgggtggccgacgacg
gagccgccgtgccgtgtggaccacccccgagtccgtggaggccggagccgtgtttgccgagatcgc
gccccaggatggccgagctgtccggcagcaggctggccgcccagcagcagatggaaggcctgctg
gcccctcaccggcccaaagagcccgcctggacctggccaccgtgggcgtgagccccgaccaccag
ggcaagggcctgggcagcgccgtggtgctgccaggcgtggaagccgccgagagggccggagtgc
ccgccttcctggaaaccagcgcccccaggaacctgccctctacgagcggctgggctttaccgtgacc
gccgacgtggaggtgccagagggccccaggacctggtgcatgacccggaagccaggcgcctgaga
aaagcttataacttcgtataatgtatgctatacgaagttataacttgtttattgcagcttataatggttacaaata
aagcaatagcatcacaaatttcacaaataaagcatttttttacactgcattctagttgtggtttgtccaaactcat
caatgtatcttatcatgtctgtgcggtgggctctatggcttctgaggcggaaagaaccagctggggctcta
gggggtatccctagagtactagggacaggattggtgacagaaaagccccatccttaggcctcctcc
ttcctagtctcctgatattgggtctaaccccacctcctgttaggcagattccttatctggtgacacacccc
atttcctggagccatcactccttgccagaacctctaaggtttgatacgatggagccagagaggatcct
gggagggagagcttggcagggggtgggagggaaggggggggatgcgtgacctgcccggttctcagt
ggccaccctgcgctaccctctcccagaacctgaactgctctgacgcggctgtctgatgcgtttcactgat
cctggtgctgcagcttccttacactttcccaagaggagaagcagtttggaaaaacaaaatcagaataagtt
ggtcctgagttctaactttggctatcacctttctagtccccaatttatattgttcctccgtgcgtcagttttacct
gtgagataaggccagtagccagccccgtcctggcagggctatggtgaggaagggggtatccgtgtgg
aaaactcccttttgtaagaatggtgcgtcctaggtgttcaccaggtcatggccgcctctactccctttctcttt
ctccatcatctttcataaagagtccccagtgctatctgggacatattcctccgcccagagcagggtccc
gcttcccctaaggccagctctgggcttctgggtttgagtccttggcaagcccaggagaggcgctcaggct
tccctgtccccttcctcgtccaccatctcatgcccctggctctcctgccccttccctacaggggttcctgg
ctctgctcttcagact
```

| SEQ ID NO: 8 Complete Sequence for second Insertion (Contains an NFAT Response Cassette driving CCL21+Poly-A, and a FRT-embedded Blasticidin Resistance gene driven by CMV) the | ataacttcgtataatgtatgctatacgaagttatggcgcgccgaagttcctattctctagaagaataggaa cttccgaataggaacttcctgcacgtgaacttgtttattgcagcttataatggttacaaataaagcaatagca tcacaaatttcacaaataaagcatttttttcactgcattctagttgtggtttgtccaaactcatcaatgtatcttat catgtctgtgagctgaaggtacgctgtatctcagtcagtcaagctagctcaggtttagttcctggtgtacttg agggggatgagttcctcaatggtggttttgaccagcttgccattcatctcaatgagcacaaagcagtcag gagcatagtcagagatcagctactacacagtccacagggctgcagctgtgaccttggtggatctgtccacct catcagagtaggggtgcctgacagccacaatggtgtcaaagtccttctgcccgttgctcacagcagacc caatggcaatggcttcagcacagacagtgacctgccaatgtaggcttcaatgtggacagcagagatga tctcccagtcttggtcctgatggccgccccgacatggtgcttgttgtcctcatagagcatggtgatcttct cagtggcgacctccaccagctccagatcctgctgagagatgttgaaggttttcatgttgggatccacgtg gagctctgccttatatagacctcccaccgtacacgcctaccgcccatttgcgtcaacggggcggggttatt |

TABLE 1-continued

Sequences.

| | |
|---|---|
| sequence shown here will replace the LoxP flanked Puromycin resistance cassette from the first insertion, the FRT sequences surrounding the Blasticidin gene in this sequence will allow for later removal or replacement of that cassette using a similar Flp-FRT recombination | acgacattttggaaagtcccgttgattttggtgccaaaacaaactcccattgacgtcaatggggtggagac<br>ttggaaatccccgtcragtcaaaccgctatccacgcccattggtgtactgccaaaaccgcatccaccatggt<br>gaagttcctattctctagaaagaataggaacttccgaataggaacttcggtacgggaggtattggacagg<br>ccgcaataaaatatctttattttcattacatctgtgtgttggtttttttgtgtgaatcgatagtactaacatacgctc<br>tccatcaaaacaaaacgaaacaaaacaaactagcaaaataggctgtccccagtcaagtgcaggtgcc<br>agaacatttctctggcctaactggccggtacctgagctcgctagcggaggaaaaactgtttcatacagaa<br>ggcgtggagaaaaactgtttcatacagaaggcgtggaggaaaaactgtttcatacagaaggcgtagat<br>ctagactctagagggtatataatggaagctcgaattccagcttggcattccggtactgttggtaaaaagca<br>ggcaatccggtactgcctgcaggaccgccatggccagtcactggctctgagcctccttatcctggact<br>gacctttggcatccccaggacccaaggcagtgatggaggggctcaggactgagcctcaagtacagcc<br>aaaggaagattcccgccaaggttgtccgcagctaccggaagcaggaaccaagataggctactccatc<br>ccaactatcctgttcttgccccgcaagcgctctcaggcagagctatgtacagacccaaaggagctctag<br>gtgcagcaactgatgcagcatctggacaagacaccatccccacagaaaccagcccagggctacagg<br>aaggacaggggggcctccaagactggcaagaaaggaaagggctccaaaggctgcaagaggactga<br>gcggtcacagacccttaagaattcgcggccgcggtcattaactgtttcctgaacagatcccaagtggca<br>tccctgtgaccctccccagtgcctctcctggccctagaagttgccactccagtgccaccagccttgtc<br>ctaataaaattaagttgcatcattttgtctgactaggtgtccttctataatattatgggtggaggggggtggt<br>atggagcaaggggcaagttgggaagacaacctgtagggcctgcggggtctattgggaaccaagctgg<br>agtgcagtggcacaatcttggctcactgcaatctcccgcctcctgggttcaagcgattctcctgcctcagcc<br>tcccgagttgttgggattccaggcatgcatgaccaggctcagctaatttttgtttttttggtagagacgggt<br>ttcaccatattggccaggctggtctccaactcctaatacaggtgatctacccacatggcctcccaaattg<br>ctgggattacaggcgtgaaccactgaccatccctgtccttagattttaaaataactataccagcaggag<br>gacgtccagacacagcataggctacctggccatgcccaaccggtgggacatttgagttgcttgcttggc<br>actgtcctctcatgcgttgggtccactcagtcagatagatgcctgttgaattgggtacgcggccagcttaatgcata<br>acttcgtataatgtatgctatacgaagttat |
| SEQ ID NO: 9<br>Human Ubiquitin C<br>Promoter Sequence<br>(varies in a few<br>bases from<br>consensus sequence) | ggcctccgcgccgggattggcgcctcccgcgggcgcccccctcctcacggcgagcgctgccacgtc<br>agacgaagggcgcaggagcgttcctgatccttccgcccggacgctcaggacagcggcccgctgctca<br>taagactcggccttagaacccagtatcagcagaaggacattttaggacgggacttgggtgactctagg<br>gcactggttttctttccagagagcggaacaaacgaggaaaagtagtcccttctcagcggattctgcggag<br>ggatctccgtgggcggtgaacgccgatgattataagggacgcaccgggtgtggcacagctagttcc<br>gtcgcagccggatttgggtcgcggttcttgattgtggatcgctgtgatcgtcacttgtgagttgcgggct<br>gctgggctggccggggattcgtggccgccgggccgctcggtaaaacggaaacgtgtggagagacc<br>gccaagggctgtagtctgggtccgcgaacaaggttgccctgaactgggggttgggggaagcgcacaa<br>aatgcggctgttcccgagtatgaatggaagacgcttgtaaggcgggctgtgaggtcgttgaaacaag<br>tggggggcatggtgggcggcaagaaccaaggtcttgaggcgttcgctaatgcgggaaagacttat<br>tcgggtgagatgggctgggcaccatagggaccctgacgtgaagtttgtcactgactggagaactc<br>gggatgtcgtaggttgcggggcggcagttatgcggtgccgttgggcagtgcacccgtacattggg<br>agcgcgcgcctcgtcgtgtcgtgacgtcaccgttctgttggcttataatgcagggtggggccacctgcc<br>ggtaggtgtgcggtaggcttttctccgtcgcaggacgcagggttcgggcctagggtaggctctcctgaa<br>tcgacaggcgccggacctctggtgaggggaggatagtgaggcgtcagtttctttggtcggttttatgt<br>acctatcttcttaagtagctgaagctccggttttgaactatgcgctcggggttggcgagtgtgttttgtgaag<br>ttttttaggcaccttttgaaatgtaatcatttgggtcaatatgtaattttcagtgttagactagtaaattgtccgct<br>aaaattctggccgttttggcttttttgttagac |
| SEQ ID NO: 10 PGK<br>Promoter Sequence | Gggtaggggaggcgcttttcccaaggcagtctggagcatgcgattagcagccccgctgggcacttgg<br>cgctacacaagtggcctctggcctcgcacacattccacatccaccggtaggcgccaaccggctccgttc<br>tttggtggccccttcgcgccaccttctaccccctcccctagtcaggaagttcccccccgcagctcg<br>cgtcatgcaggacgtgacaaatggaagtagcacgtctcactagtctcgtacaaatggacagcaccgctg<br>agcaatggaagcgggtaggcctttggggcagcggccaatagcagattgctccttcgctttctgggctc<br>agaggctgggaaggggtgggtccggggcgggctcaggggcgggctcaggggcggggcgggcg<br>cccgaaggtcctccggaggcccggcattccgcacgcttcaaaagcgcacgtctgccgcgctgttctctt<br>cttcctcataccgggcattcg |
| SEQ ID NO: 11<br>CMV<br>Promoter/Enhancer | Cgttacataacttacggtaaatggcccgcctggctgaccgcccaacgaccccgcccattgacgtcaat<br>aatgacgtatgacccatagtaacgccaatagggactttccattgacgtcaatgggtggagtatttacggta<br>aactgcccacttggcagtacatcaagtgtatcatatgccaagtacgccccctattgacgtcaatgacggta<br>aatggcccgcctggcattatgcccagtacatgaccttatgggactttcctacttggcagtacatctacgtat<br>tagtcatcgctattaccatgctgatgcggttttggcagtacatcaatgggcgtggatagcggtttgactcac<br>ggggatttccaagtctccaccccattgacgtcaatgggagtttgttttggcaccaaaatcaacgggacttt<br>ccaaaatgtcgtaacaactccgccccattgacgcaaatgggcggtaggcgtgtacggtgggaggtctat<br>ataagcagagct |
| SEQ ID NO: 12 High<br>Affinity Variant<br>Immunoglobulin<br>Gamma Fc Region<br>Receptor III-A<br>amino acid sequence<br>(full length form).<br>The Val at position<br>176 is underlined. | Met Trp Gln Leu Leu Leu Pro Thr Ala Leu Leu Leu Val Ser Ala Gly<br>Met Arg Thr Glu Asp Leu Pro Lys Ala Val Val Phe Leu Glu Pro Gln Trp<br>Tyr Arg Val Leu Glu Lys Asp Ser Val Thr Leu Lys Cys Gln Gly Ala Tyr<br>Ser Pro Glu Asp Asn Ser Thr Gln Trp Phe His Asn Glu Ser Leu Ile Ser<br>Ser Gln Ala Set Ser Tyr Phe Ile Asp Ala Ala Thr Val Asp Asp Ser Gly<br>Glu Tyr Arg Cys Gln Thr Asn Leu Ser Thr Leu Ser Asp Pro Val Gln Leu<br>Glu Val His Ile Gly Trp Leu Leu Leu Gln Ala Pro Arg Trp Val Phe Lys<br>Glu Glu Asp Pro Ile His Leu Arg Cys His Ser Trp Lys Asn Thr Ala Leu<br>His Lys Val Thr Tyr Leu Gln Asn Gly Lys Gly Arg Lys Tyr Phe His His<br>Asn Ser Asp Phe Tyr Ile Pro Lys Ala Thr Leu Lys Asp Ser Gly Ser Tyr<br>Phe Cys Arg Gly Leu <u>Val</u> Gly Ser Lys Asn Val Set Ser Glu Thr Val Asn<br>Ile Thr Ile Thr Gln <u>Gly</u> Leu Ala Val Set Thr Ile Set Ser Phe Phe Pro Pro<br>Gly Tyr Gln Val Set Phe Cys Leu Val Met Val Leu Leu Phe Ala Val Asp<br>Thr Gly Leu Tyr Phe Ser Val Lys Thr Asn Ile Arg Set Set Thr Arg Asp<br>Trp Lys Asp His Lys Phe Lys Trp Arg Lys Asp Pro Gln Asp Lys |

TABLE 1-continued

Sequences.

| | |
|---|---|
| SEQ ID NO: 13 High Affinity Variant Immunoglobulin Gamma Fc Region Receptor III-A nucleic acid sequence (full length form). | atgtggca gctgctgctg cctacagctc tcctgctgct ggtgtccgcc ggcatgagaa ccgaggatct acctaaggcc gtggtgttcc tggaacccca gtggtacaga gtactggaaa aggacagcgt gaccctgaag tgccagggcg cctacagccc cgaggacaat agcacccagt ggttccacaa cgagagcctg atcagcagcc aggccagcag ctacttcatc gacgccgcca ccgtggacga cagcggcgag tatagatgcc agaccaacct gagcaccctg agcgaccccg tgcagctgga agtgcacatc ggatggctgc tgctgcaggc ccccagatgg gggtgttcaaag aagaggaccc catccacctg agatgccact cttggaagaa caccgccctg cacaaagtga cctacctgca gaacggcaag ggcagaaagt acttccacca caacagcgac ttctacatcc ccaaggccac cctgaaggac tccggctcct acttctgcag aggcctcgtg ggcagcaaga acgtgtccag cgagacagtg aacatccacc tcacccaggg cctggccgtg tctaccatca gcagtttttt cccaccccgc taccaggtgt ccttctgcct cgtgatggtg ctgctgttcg ccgtggacac cggcctgtac ttcagcgtga aaacaaacat cagaagcagc acccgggact ggaaggacca caagttcaag tggcggaagg acccccagga caagtga |
| SEQ ID NO: 14 ER IL-2 nucleic acid sequence | atgtaccgga tgcagctgct gagctgtatc gcctgtctct ggcctcgtga ccaacagcgc ccctaccagc agcagcacca agaaaaccca gctgcagctg aacatctgc tgctggacct gcagatgatc ctgaacggca tcaacaacta caagaacccc aagctgaccc ggatgctgac cttcaagttc tacatgccca agaaggccac cgaactgaaa catctgcagt gcctagaaga ggaactgaag cccctggaag aagtgctgaa cctggcccag agcaagaact tccacctgag gcccagggac ctgatcagca catcaacgt gatcgtgctg gaactgaaag gcagcgagac aaccttcatg tgcgagtacg ccgacgagac agctaccatc gtggaatttc tgaaccgatg gatcaccttc tgccagagca tcatcagcac cctgaccggc tccgaaagg acgagctgtga |
| SEQ ID NO: 15 ER IL-2 (ER retention signal is underlined) amino acid sequence | Met Tyr Arg Met Gln Leu Leu Ser Cys Ile Ala Leu Ser Leu Ala Leu Val Thr Asn Ser Ala Pro Thr Ser Ser Ser Thr Lys Lys Thr Gln Leu Gln Leu Glu His Leu Leu Leu Asp Leu Gln Met Ile Leu Asn Gly Ile Asn Asn Tyr Lys Asn Pro Lys Leu Thr Arg Met Leu Thr Phe Lys Phe Tyr Met Pro Lys Lys Ala Thr Glu Leu Lys His Leu Gln Cys Leu Glu Glu Glu Leu Lys Pro Leu Glu Glu Val Leu Asn Leu Ala Gln Ser Lys Asn Phe His Leu Arg Pro Arg Asp Leu Ile Ser Asn Ile Asn Val Ile Val Leu Glu Leu Lys Gly Ser Glu Thr Thr Phe Met Cys Glu Tyr Ala Asp Gill Thr Ala Thr Ile Val Glu Phe Leu Asn Arg Trp Ile Thr Phe Cys Gln Ser Ile Ile Ser Thr Leu Thr Gly Ser Glu <u>Lys Asp Glu Leu</u> |
| SEQ ID NO: 16 CCL19 sequence | Atggccctgc tactggcccc tcagcctgct ggttctctgg acttcccaag ccccaactct gagtggcacc aatgatgctg aagactgctg cctgtctgtg acccagaaac ccatccctgg gtacatcgtg aggaacttcc actacctttctc atcaaggatg gctgcagggt gcctgctgta gtgttcacca cactgagggg ccgccagct ctgtgcaccc cagaccagcc ctgggtagaa cgcatcatcc agagactgca gaggacctca gccaag atgaagcgcc gcagcagt |
| 2A peptide linker 1 SEQ ID NO: 17 E2A | cagtgcacca actacgccct gctgaagctg gccggcgacg tggagagcaa ccctggccct |
| 2A peptide linker 2 SEQ ID NO: 18 T2A | gagggcagag gcagcctgct gacctgcggc gatgtggagg aaaacccagg ccca |

What is claimed is:

1. A modified NK-92 cell comprising (i) a nucleic acid encoding C-C chemokine receptor type 7 (CCR7) operably linked to a promoter, and (ii) a nucleic acid encoding C-C motif ligand 21 (CCL21) operably linked to a promoter, wherein the promoter operably linked to CCL21 comprises one or more NFAT binding elements SEQ ID NO:4 and a minimal promoter SEQ ID NO:5, and has at least 90%, 91%, 92%, 93%, 94%, 95%, 96%, 97%, 98% or 99% identity to SEQ ID NO:6.

2. The modified NK-92 cell of claim 1, wherein the nucleic acid encoding CCR7 has at least 90%, 91%, 92%, 93%, 94%, 95%, 96%, 97%, 98% or 99% identity to SEQ ID NO:1.

3. The modified NK-92 cell of claim 1, wherein the nucleic acid encoding CCL21 has at least 90%, 91%, 92%, 93%, 94%, 95%, 96%, 97%, 98% or 99% identity to SEQ ID NO:2.

4. The modified NK-92 cell of claim 1, wherein the modified NK-92 cell further comprises a nucleic acid encoding C-C motif ligand 19 (CCL19).

5. The modified NK-92 cell of claim 4, wherein the nucleic acid encoding CCL19 is linked to the nucleic acid encoding CCL21 by a 2A peptide linker and wherein the same promoter drives expression of CCL19 and CCL21.

6. A composition comprising the NK-92 cell of claim 1 and a pharmaceutically acceptable excipient.

7. A kit comprising the NK-92 cell of claim 1 and instructions for use.

\* \* \* \* \*

SEQUENCE LISTING

<160> NUMBER OF SEQ ID NOS: 18

<210> SEQ ID NO 1
<211> LENGTH: 1125
<212> TYPE: DNA
<213> ORGANISM: Artificial Sequence
<220> FEATURE:
<223> OTHER INFORMATION: Synthetic Construct

<400> SEQUENCE: 1
gccaccatga aaagcgtgct ggtggtggct ctccttgtca ttttccaggt atgcctgtgt      60
caagatgagg tcacggacga ttacatcgga gacaacacca cagtggacta cactttgttc     120
gagtctttgt gctccaagaa ggacgtgcgg aactttaaag cctggttcct ccctatcatg     180
tactccatca tttgtttcgt gggcctactg ggcaatgggc tggtcgtgtt gacctatatc     240
tatttcaaga ggctcaagac catgaccgat acctacctgc tcaacctggc ggtggcagac     300
atcctcttcc tcctgacccc tccttctgg gcctacagcg cggccaagtc ctgggtcttc     360

| | |
|---|---|
| ggtgtccact tttgcaagct catctttgcc atctacaaga tgagcttctt cagtggcatg | 420 |
| ctcctacttc tttgcatcag cattgaccgc tacgtggcca tcgtccaggc tgtctcagct | 480 |
| caccgccacc gtgcccgcgt ccttctcatc agcaagctgt cctgtgtggg catctggata | 540 |
| ctagccacag tgctctccat cccagagctc ctgtacagtg acctcagag gagcagcagt | 600 |
| gagcaagcga tgcgatgctc tctcatcaca gagcatgtgg aggcctttat caccatccag | 660 |
| gtggcccaga tggtgatcgg ctttctggtc ccctgctgg ccatgagctt ctgttacctt | 720 |
| gtcatcatcc gcaccctgct ccaggcacgc aactttgagc gcaacaaggc catcaaggtg | 780 |
| atcatcgctg tggtcgtggt cttcatagtc ttccagctgc cctacaatgg ggtggtcctg | 840 |
| gcccagacgg tggccaactt caacatcacc agtagcacct gtgagctcag taagcaactc | 900 |
| aacatcgcct acgacgtcac ctacagcctg gcctgcgtcc gctgctgcgt caacccttc | 960 |
| ttgtacgcct tcatcggcgt caagttccgc aacgatctct tcaagctctt caaggacctg | 1020 |
| ggctgcctca gccaggagca gctccggcag tggtcttcct gtcggcacat ccggcgctcc | 1080 |
| tccatgagtg tggaggccga gaccaccacc accttctccc catag | 1125 |

<210> SEQ ID NO 2
<211> LENGTH: 402
<212> TYPE: DNA
<213> ORGANISM: Artificial Sequence
<220> FEATURE:
<223> OTHER INFORMATION: Synthetic Construct

<400> SEQUENCE: 2

| | |
|---|---|
| accgccatgg ctcagtcact ggctctgagc ctccttatcc tggttctggc ctttggcatc | 60 |
| cccaggaccc aaggcagtga tggaggggct caggactgtt gcctcaagta cagccaaagg | 120 |
| aagattcccg ccaaggttgt ccgcagctac cggaagcagg aaccaagctt aggctgctcc | 180 |
| atcccagcta tcctgttctt gccccgcaag cgctctcagg cagagctatg tgcagaccca | 240 |
| aaggagctct gggtgcagca gctgatgcag catctggaca agacaccatc cccacagaaa | 300 |
| ccagcccagg gctgcaggaa ggacaggggg gcctccaaga ctggcaagaa aggaaagggc | 360 |
| tccaaaggct gcaagaggac tgagcggtca cagacccctt aa | 402 |

<210> SEQ ID NO 3
<211> LENGTH: 1178
<212> TYPE: DNA
<213> ORGANISM: Artificial Sequence
<220> FEATURE:
<223> OTHER INFORMATION: Synthetic Construct

<400> SEQUENCE: 3

| | |
|---|---|
| gctccggtgc ccgtcagtgg gcagagcgca catcgcccac agtccccgag aagttggggg | 60 |
| gagggggtcgg caattgaacc ggtgcctaga gaaggtggcg cggggtaaac tgggaaagtg | 120 |
| atgtcgtgta ctggctccgc cttttttcccg agggtggggg agaaccgtat ataagtgcag | 180 |
| tagtcgccgt gaacgttctt tttcgcaacg ggtttgccgc cagaacacag gtaagtgccg | 240 |
| tgtgtggttc ccgcgggcct ggcctctttta cgggttatgg cccttgcgtg ccttgaatta | 300 |
| cttccacctg gctgcagtac gtgattcttg atcccgagct tcgggttgga agtgggtggg | 360 |
| agagttcgag gccttgcgct taaggagccc cttcgcctcg tgcttgagtt gaggcctggc | 420 |
| ctgggcgctg gggccgccgc gtgcgaatcc ggtggcacct tcgcgcctgt ctcgctgctt | 480 |
| tcgataagtc tctagccatt taaaatttt gatgacctgc tgcgacgctt ttttctggc | 540 |
| aagatagtct tgtaaatgcg ggccaagatc tgcacactgg tatttcggtt tttggggccg | 600 |

-continued

```
cgggcggcga cggggcccgt gcgtcccagc gcacatgttc ggcgaggcgg ggcctgcgag    660
cgcggccacc gagaatcgga cgggggtagt ctcaagctgg ccggcctgct ctggtgcctg    720
gcctcgcgcc gccgtgtatc gccccgccct gggcggcaag gctggcccgg tcggcaccag    780
ttgcgtgagc ggaaagatgg ccgcttcccg gccctgctgc agggagctca aaatggagga    840
cgcggcgctc gggagagcgg gcgggtgagt cacccacaca aaggaaaagg gcctttccgt    900
cctcagccgt cgcttcatgt gactccacgg agtaccgggc gccgtccagg cacctcgatt    960
agttctcgag cttttggagt acgtcgtctt taggttgggg ggaggggttt tatgcgatgg   1020
agtttcccca cactgagtgg gtggagactg aagttaggcc agcttggcac ttgatgtaat   1080
tctccttgga atttgcccct tttgagtttg gatcttggtt cattctcaag cctcagacag   1140
tggttcaaag ttttttttctt ccatttcagg tgtcgtga                          1178
```

<210> SEQ ID NO 4
<211> LENGTH: 30
<212> TYPE: DNA
<213> ORGANISM: Artificial Sequence
<220> FEATURE:
<223> OTHER INFORMATION: synthetic construct

<400> SEQUENCE: 4

```
ggaggaaaaa ctgtttcata cagaaggcgt                                     30
```

<210> SEQ ID NO 5
<211> LENGTH: 32
<212> TYPE: DNA
<213> ORGANISM: Artificial Sequence
<220> FEATURE:
<223> OTHER INFORMATION: synthetic construct

<400> SEQUENCE: 5

```
tagagggtat ataatggaag ctcgaattcc ag                                  32
```

<210> SEQ ID NO 6
<211> LENGTH: 320
<212> TYPE: DNA
<213> ORGANISM: artificial sequence
<220> FEATURE:
<223> OTHER INFORMATION: synthetic construct

<400> SEQUENCE: 6

```
aataaaatat ctttattttc attacatctg tgtgttggtt ttttgtgtga atcgatagta    60
ctaacatacg ctctccatca aaacaaaacg aaacaaaaca aactagcaaa ataggctgtc   120
cccagtgcaa gtgcaggtgc cagaacattt ctctggccta actggccggt acctgagctc   180
gctagcggaa gaaaaactgt tcatacaga aggcgtggag gaaaaactgt tcatacaga    240 aggcgtggag gaaaaactgt tcatacaga aggcgtagat ctagactcta gagggtatat   300
aatggaagct cgaattccag                                               320
```

<210> SEQ ID NO 7
<211> LENGTH: 6887
<212> TYPE: DNA
<213> ORGANISM: artificial sequence
<220> FEATURE:
<223> OTHER INFORMATION: synthetic construct

<400> SEQUENCE: 7

```
aggtcctgct ttctctgacc tgcattctct cccctgggcc tgtgccgctt tctgtctgca    60
```

-continued

```
gcttgtggcc tgggtcacct ctacggctgg cccagatcct tccctgccgc ctccttcagg    120
ttccgtcttc ctccactccc tcttcccctt gctctctgct gtgttgctgc caaggatgc     180 tctttccgga gcacttcctt ctcggcgctg caccacgtga tgtcctctga gcggatcctc    240
cccgtgtctg ggtcctctcc gggcatctct cctccctcac caacccat gccgtcttca      300 ctcgctgggt tccctttcc ttctccttct ggggcctgtg ccatctctcg tttcttagga     360
tggccttctc cgacggatgt ctcccttgcg tcccgcctcc ccttcttgta ggcctgcatc    420
atcaccgttt ttctggacaa ccccaaagta ccccgtctcc ctggctttag ccacctctcc    480
atcctcttgc tttctttgcc tggacacccc gttctcctgt ggattcgggt cacctctcac    540
tcctttcatt tgggcagctc ccctaccccc cttacctctc tagtctgtgc tagctcttcc    600 agcccctgt catggcatct tccaggggtc cgagagctca gctagtcttc ttcctccaac     660
ccgggcccct atgtccactt caggacagca tgtttgctgc ctccagggat cctgtgtccc    720
cgagctggga ccaccttata ttcccagggc cggttaatgt ggctctggtt ctgggtactt    780
ttatctgtcc cctccacccc acagtggggt acctctagag ctgaccaaaa gagcaccaaa    840
ggcgccctga ccttcagccc ctacctgcgc tccggtgccc gtcagtgggc agagcgcaca    900
tcgcccacag tccccgagaa gttgggggga gggtcggca attgaaccgg tgcctagaga    960
aggtggcgcg gggtaaactg gaaagtgat gtcgtgtact ggctccgcct ttttcccgag    1020 ggtggggag aaccgtatat aagtgcagta gtcgccgtga acgttctttt tcgcaacggg    1080
tttgccgcca gaacacaggt aagtgccgtg tgtggttccc gcgggcctgg cctctttacg    1140
ggttatggcc cttgcgtgcc ttgaattact tccacctggc tgcagtacgt gattcttgat    1200
cccgagcttc gggttggaag tgggtgggag agttcgaggc cttgcgctta aggagcccct    1260
tcgcctcgtg cttgagttga ggcctggcct gggcgctggg gccgccgcgt gcgaatctgg    1320
tggcaccttc gcgcctgtct cgctgctttc gataagtctc tagccattta aaattttga     1380 tgacctgctg cgacgcttt ttctggcaa gatagtcttg taaatgcggg ccaagatctg      1440
cacactggta tttcggtttt tggggccgcg gcggcgacg gggcccgtgc gtcccagcgc     1500
acatgttcgg cgaggcgggg cctgcgagcg cggccaccga gaatcggacg ggggtagtct    1560
caagctggcc ggcctgctct ggtgcctggc ctcgcgccgc cgtgtatcgc cccgccctgg    1620
gcggcaaggc tggcccggtc ggcaccagtt gcgtgagcgg aaagatggcc gcttcccggc    1680
cctgctgcag ggagctcaaa atggaggacg cggcgctcgg gagagcgggc gggtgagtca    1740
cccacacaaa ggaaaagggc cttccgtcc tcagccgtcg cttcatgtga ctccacggag     1800
taccgggcgc cgtccaggca cctcgattag ttctcgagct tttggagtac gtcgtcttta    1860
ggttgggggg aggggtttta tgcgatggag tttccccaca ctgagtgggt ggagactgaa    1920
gttaggccag cttggcactt gatgtaattc tccttggaat ttgccctttt tgagtttgga    1980
tcttggttca ttctcaagcc tcagacagtg gttcaaagtt ttttcttcc atttcaggtg     2040 tcgtgataat acgactcact atagggagac ccaagctgga attcggcggc cgccaccatg    2100
aaaagcgtgc tggtggtggc tctccttgtc attttccagg tatgcctgtg tcaagatgag    2160
gtcacggacg attacatcgg agacaacacc acagtggact acactttgtt cgagtctttg    2220
tgctccaaga aggacgtgcg gaactttaaa gcctggttcc tccctatcat gtactccatc    2280
atttgtttcg tgggcctact gggcaatggg ctggtcgtgt tgacctatat ctatttcaag    2340
aggctcaaga ccatgaccga tacctacctg ctcaacctgg cggtggcaga catcctcttc    2400
ctcctgaccc ttccccttctg ggcctacagc gcggccaagt cctgggtctt cggtgtccac    2460
```

```
ttttgcaagc tcatctttgc catctacaag atgagcttct tcagtggcat gctcctactt    2520
ctttgcatca gcattgaccg ctacgtggcc atcgtccagg ctgtctcagc tcaccgccac    2580
cgtgcccgcg tccttctcat cagcaagctg tcctgtgtgg gcatctggat actagccaca    2640
gtgctctcca tcccagagct cctgtacagt gacctccaga ggagcagcag tgagcaagcg    2700
atgcgatgct ctctcatcac agagcatgtg gaggccttta tcaccatcca ggtggcccag    2760
atggtgatcg gctttctggt cccccctgctg gccatgagct tctgttacct tgtcatcatc    2820
cgcaccctgc tccaggcacg caactttgag cgcaacaagg ccatcaaggt gatcatcgct    2880
gtggtcgtgg tcttcatagt cttccagctg ccctacaatg gggtggtcct ggcccagacg    2940
gtggccaact tcaacatcac cagtagcacc tgtgagctca gtaagcaact caacatcgcc    3000
tacgacgtca cctacagcct ggcctgcgtc cgctgctgcg tcaacccttt cttgtacgcc    3060
ttcatcggcg tcaagttccg caacgatctc ttcaagctct tcaaggacct gggctgcctc    3120
agccaggagc agctccggca gtggtcttcc tgtcggcaca tccggcgctc ctccatgagt    3180
gtggaggccg agaccaccac caccttctcc ccataggcgg ccgcggtcat agctgtttcc    3240
tgaacagatc ccggggtggca tccctgtgac ccctccccag tgcctctcct ggccctggaa    3300
gttgccactc cagtgcccac cagccttgtc ctaataaaat taagttgcat cattttgtct    3360
gactaggtgt ccttctataa tattatgggg tggaggggg tggtatggag caaggggcaa    3420
gttgggaaga caacctgtag ggcctgcggg gtctattggg aaccaagctg gagtgcagtg    3480
gcacaatctt ggctcactgc aatctccgcc tcctgggttc aagcgattct cctgcctcag    3540
cctcccgagt tgttgggatt ccaggcatgc atgaccaggc tcagctaatt tttgtttttt    3600
tggtagagac ggggttttcac catattggcc aggctggtct ccaactccta atctcaggtg    3660
atctacccac cttggcctcc caaattgctg ggattacagg cgtgaaccac tgctcccttc    3720
cctgtccttc tgattttaaa ataactatac cagcaggagg acgtccagac acagcatagg    3780
ctacctggcc atgcccaacc ggtgggacat ttgagttgct tgcttggcac tgtcctctca    3840
tgcgttgggt ccactcagta gatgcctgtt gaattgggta cgcggccagc ttaatgcata    3900
acttcgtata atgtatgcta tacgaagtta tgttaattaa gggtgcagcg gcctccgcgc    3960
cgggttttgg cgcctcccgc gggcgccccc ctcctcacgg cgagcgctgc cacgtcagac    4020
gaagggcgca ggagcgttcc tgatccttcc gcccggacgc tcaggacagc ggcccgctgc    4080
tcataagact cggccttaga accccagtat cagcagaagg acattttagg acgggacttg    4140
ggtgactcta gggcactggt tttctttcca gagagcggaa caggcgagga aaagtagtcc    4200
cttctcggcg attctgcgga gggatctccg tggggcggtg aacgccgatg attatataag    4260
gacgcgccgg tgtggcaca gctagttccg tcgcagccgg gatttgggtc gcggttcttg    4320
tttgtggatc gctgtgatcg tcacttggtg agttgcgggc tgctgggctg ccggggctt    4380 tcgtggccgc cgggccgctc ggtgggacgg aagcgtgtgg agagaccgcc aagggctgta    4440
gtctgggtcc gcgagcaagg ttgccctgaa ctggggggttg gggggagcgc acaaaatggc    4500
ggctgttccc gagtcttgaa tggaagacgc ttgtaaggcg ggctgtgagg tcgttgaaac    4560
aaggtggggg catggtgggc ggcaagaac ccaaggtctt gaggccttcg ctaatgcggg    4620
aaagctctta ttcgggtgag atgggctggg gcaccatctg ggaccctga cgtgaagttt    4680 gtcactgact ggagaactcg ggtttgtcgt ctggttgcgg gggcggcagt tatgcggtgc    4740
cgttgggcag tgcacccgta ccttttgggag cgcgcgcctc gtcgtgtcgt gacgtcaccc    4800
```

```
gttctgttgg cttataatgc agggtggggc cacctgccgg taggtgtgcg gtaggctttt   4860
ctccgtcgca ggacgcaggg ttcgggccta gggtaggctc tcctgaatcg acaggcgccg   4920
gacctctggt gaggggaggg ataagtgagg cgtcagtttc tttggtcggt tttatgtacc   4980
tatcttctta agtagctgaa gctccggttt tgaactatgc gctcggggtt ggcgagtgtg   5040
ttttgtgaag ttttttaggc acctttgaa atgtaatcat ttgggtcaat atgtaatttt   5100
cagtgttaga ctagtaaatt gtccgctaaa ttctggccgt ttttggcttt tttgttagac   5160
gaagcttggg ctgcaggtcg actctagtgt aacgccacca tgaccgagta caagcctacc   5220
gtgaggctgg ccacccggga cgacgtgccc agagccgtga ggacactggc cgccgcttc   5280
gccgactacc ccgccacccg gcacaccgtg accccgacc ggcacatcga gcgggtgacc   5340
gagctgcagg aactgttcct gaccagagtg ggcctggata tcggcaaagt gtgggtggcc   5400
gacgacggag ccgccgtggc cgtgtggacc accccgagt ccgtggaggc cggagccgtg   5460
tttgccgaga tcggccccag gatggccgag ctgtccggca gcaggctggc cgcccagcag   5520
cagatggaag gcctgctggc ccctcaccgg cccaaagagc ccgcctggtt cctggccacc   5580
gtgggcgtga gccccgacca ccagggcaag ggcctgggca cgccgtggt gctgccaggc   5640
gtggaagccg ccgagagggc cggagtgccc gccttcctgg aaaccagcgc ccccaggaac   5700
ctgcccttct acgagcggct gggctttacc gtgaccgccg acgtggaggt gccagagggc   5760
cccaggacct ggtgcatgac ccggaagcca ggcgcctgag aaaagcttat aacttcgtat   5820
aatgtatgct atacgaagtt ataacttgtt tattgcagct tataatggtt acaaataaag   5880
caatagcatc acaaatttca caaataaagc attttttca ctgcattcta gttgtggttt   5940
gtccaaactc atcaatgtat cttatcatgt ctgtgcggtg ggctctatgg cttctgaggc   6000
ggaaagaacc agctggggct ctaggggta tcccctctag agtactaggg acaggattgg   6060
tgacagaaaa gccccatcct taggcctcct ccttcctagt ctcctgatat gggtctaac   6120
ccccacctcc tgttaggcag attccttatc tggtgacaca cccccatttc ctggagccat   6180
ctctctcctt gccagaacct ctaaggttg cttacgatgg agccagagag gatcctggga   6240
gggagagctt ggcaggggt gggagggaag gggggatgc gtgacctgcc cggttctcag   6300
tggccaccct gcgctaccct ctcccagaac ctgagctgct ctgacgcggc tgtctggtgc   6360
gtttcactga tcctggtgct gcagcttcct tacacttccc aagaggagaa gcagtttgga   6420
aaaacaaat cagaataagt tggtcctgag ttctaacttt ggctcttcac ctttctagtc   6480
cccaatttat attgttcctc cgtgcgtcag ttttacctgt gagataaggc cagtagccag   6540
ccccgtcctg gcagggctgt ggtgaggagg ggggtgtccg tgtggaaaac tccctttgtg   6600
agaatggtgc gtcctaggtg ttcaccaggt cgtggccgcc tctactccct ttctcttct   6660
ccatccttct ttccttaaag agtccccagt gctatctggg acatattcct ccgcccagag   6720
cagggtcccg cttccctaag gccctgctct gggcttctgg gtttgagtcc ttggcaagcc   6780
caggagaggc gctcaggctt ccctgtcccc cttcctcgtc caccatctca tgcccctggc   6840
tctcctgccc cttccctaca ggggttcctg gctctgctct tcagact           6887
```

<210> SEQ ID NO 8
<211> LENGTH: 2497
<212> TYPE: DNA
<213> ORGANISM: artificial sequence
<220> FEATURE:
<223> OTHER INFORMATION: synthetic construct

<400> SEQUENCE: 8

```
ataacttcgt ataatgtatg ctatacgaag ttatggcgcg ccgaagttcc tattcttcta    60
gaagaatagg aacttccgaa taggaacttc ctgcacgtga acttgtttat tgcagcttat   120
aatggttaca aataaagcaa tagcatcaca aatttcacaa ataaagcatt tttttcactg   180
cattctagtt gtggtttgtc caaactcatc aatgtatctt atcatgtctg tgagctgaag   240
gtacgctgta tctcagtcag tcaagctagc tcaggtttag ttcctggtgt acttgagggg   300
gatgagttcc tcaatggtgg ttttgaccag cttgccattc atctcaatga gcacaaagca   360
gtcaggagca tagtcagaga tcagctctct acacatgcca caggggctga ccaccctgat   420
ggatctgtcc acctcatcag gtaggggtg cctgacagcc acaatggtgt caaagtcctt   480
ctgcccgttg ctcacagcag acccaatggc aatggcttca gcacagacag tgaccctgcc   540
aatgtaggct tcaatgtgga cagcagagat gatctcccca gtcttggtcc tgatggccgc   600
cccgacatgg tgcttgttgt cctcatagag catggtgatc ttctcagtgg cgacctccac   660
cagctccaga tcctgctgag agatgttgaa ggttttcatg ttgggatcca cgtggagctc   720
tgcttatata gacctcccac cgtacacgcc taccgcccat ttgcgtcaac ggggcggggt   780
tattacgaca ttttggaaag tcccgttgat tttggtgcca aaacaaactc ccattgacgt   840
caatggggtg gagacttgga aatccccgtg agtcaaaccg ctatccacgc ccattggtgt   900
actgccaaaa ccgcatcacc atggtgaagt tcctattctc tagaaagaat aggaacttcc   960
gaataggaac ttcggtacgg gaggtattgg acaggccgca ataaaatatc tttattttca  1020
ttacatctgt gtgttggttt tttgtgtgaa tcgatagtac taacatacgc tctccatcaa  1080
aacaaaacga aacaaaacaa actagcaaaa taggctgtcc ccagtgcaag tgcaggtgcc  1140
agaacatttc tctggcctaa ctggccggta cctgagctcg ctagcggagg aaaaactgtt  1200
tcatacagaa ggcgtggagg aaaaactgtt tcatacagaa ggcgtggagg aaaaactgtt  1260
tcatacagaa ggcgtagatc tagactctag agggtatata atggaagctc gaattccagc  1320
ttggcattcc ggtactgttg gtaaaaagct tggcaatccg gtactgcctg caggaccgcc  1380
atggctcagt cactggctct gagcctcctt atcctggttc tggcctttgg catccccagg  1440
acccaaggca gtgatggagg ggctcaggac tgttgcctca agtacagcca aaggaagatt  1500
cccgccaagg ttgtccgcag ctaccggaag caggaaccaa gcttaggctg ctccatccca  1560
gctatcctgt tcttgccccg caagcgctct caggcagagc tatgtgcaga cccaaaggag  1620
ctctgggtgc agcagctgat gcagcatctg acaagacac catccccaca gaaaccagcc  1680
cagggctgca ggaaggacag gggggcctcc aagactggca agaaaggaaa gggctccaaa  1740
ggctgcaaga ggactgagcg gtcacagacc ccttaagaat tcgcggccgc ggtcatagct  1800
gtttcctgaa cagatcccgg gtggcatccc tgtgacccct ccccagtgcc tctcctggcc  1860
ctggaagttg ccactccagt gcccaccagc cttgtcctaa taaaattaag ttgcatcatt  1920
ttgtctgact aggtgtcctt ctataatatt atggggtgga gggggtggt atggagcaag  1980 gggcaagttg ggaagacaac ctgtagggcc tgcgggtct attgggaacc aagctggagt  2040
gcagtggcac aatcttggct cactgcaatc tccgcctcct gggttcaagc gattctcctg  2100
cctcagcctc ccgagttgtt gggattccag gcatgcatga ccaggctcag ctaatttttg  2160 ttttttttggt agagacgggg tttcaccata ttggccaggc tggtctccaa ctcctaatct  2220
caggtgatct acccaccttg gcctcccaaa ttgctgggat tacaggcgtg aaccactgct  2280
cccttccctg tccttctgat tttaaaataa ctataccagc aggaggacgt ccagacacag  2340
```

| | |
|---|---|
| cataggctac ctggccatgc ccaaccggtg ggacatttga gttgcttgct tggcactgtc | 2400 |
| ctctcatgcg ttgggtccac tcagtagatg cctgttgaat tgggtacgcg gccagcttaa | 2460 |
| tgcataactt cgtataatgt atgctatacg aagttat | 2497 |

<210> SEQ ID NO 9
<211> LENGTH: 1211
<212> TYPE: DNA
<213> ORGANISM: homo sapiens

<400> SEQUENCE: 9

| | |
|---|---|
| ggcctccgcg ccgggttttg gcgcctcccg cgggcgcccc cctcctcacg gcgagcgctg | 60 |
| ccacgtcaga cgaagggcgc aggagcgttc ctgatccttc cgcccggacg ctcaggacag | 120 |
| cggcccgctg ctcataagac tcggccttag aacccccagta tcagcagaag gacattttag | 180 |
| gacgggactt gggtgactct agggcactgg ttttctttcc agagagcgga acaggcgagg | 240 |
| aaaagtagtc ccttctcggc gattctgcgg agggatctcc gtggggcggt gaacgccgat | 300 |
| gattatataa ggacgcgccg ggtgtggcac agctagttcc gtcgcagccg ggatttgggt | 360 |
| cgcggttctt gtttgtggat cgctgtgatc gtcacttggt gagttgcggg ctgctgggct | 420 |
| ggccggggct ttcgtggccg ccgggccgct cggtgggacg gaagcgtgtg gagagaccgc | 480 |
| caagggctgt agtctgggtc cgcgagcaag gttgccctga actgggggtt gggggagcg | 540 |
| cacaaaatgg cggctgttcc cgagtcttga atggaagacg cttgtaaggc gggctgtgag | 600 |
| gtcgttgaaa caaggtgggg ggcatggtgg gcggcaagaa cccaaggtct tgaggccttc | 660 |
| gctaatgcgg gaaagctctt attcgggtga gatgggctgg ggcaccatct ggggaccctg | 720 |
| acgtgaagtt tgtcactgac tggagaactc gggtttgtcg tctggttgcg ggggcggcag | 780 |
| ttatgcggtg ccgttgggca gtgcacccgt acctttggga gcgcgcgcct cgtcgtgtcg | 840 |
| tgacgtcacc cgttctgttg gcttataatg cagggtgggg ccacctgccg gtaggtgtgc | 900 |
| ggtaggcttt tctccgtcgc aggacgcagg gttcgggcct agggtaggct ctcctgaatc | 960 |
| gacaggcgcc ggacctctgg tgaggggagg gataagtgag gcgtcagttt ctttggtcgg | 1020 |
| ttttatgtac ctatcttctt aagtagctga agctccggtt ttgaactatg cgctcggggt | 1080 |
| tggcgagtgt gttttgtgaa gtttttttagg cacctttga aatgtaatca tttgggtcaa | 1140 |
| tatgtaattt tcagtgttag actagtaaat tgtccgctaa attctggccg tttttggctt | 1200 |
| ttttgttaga c | 1211 |

<210> SEQ ID NO 10
<211> LENGTH: 500
<212> TYPE: DNA
<213> ORGANISM: artificial sequence
<220> FEATURE:
<223> OTHER INFORMATION: synthetic construct

<400> SEQUENCE: 10

| | |
|---|---|
| gggtagggga ggcgcttttc ccaaggcagt ctggagcatg cgctttagca gccccgctgg | 60 |
| gcacttggcg ctacacaagt ggcctctggc ctcgcacaca ttccacatcc accggtaggc | 120 |
| gccaaccggc tccgttcttt ggtggcccct tcgcgccacc ttctacccct ccctagtca | 180 |
| ggaagttccc ccccgccccg cagctcgcgt catgcaggac gtgacaaatg gaagtagcac | 240 |
| gtctcactag tctcgtgcaa atggacagca ccgctgagca atggaagcgg gtaggcccctt | 300 |
| ggggcagcgc ccaatagcag cttttgctcct tcgcttctg ggctcagagg ctgggaaggg | 360 |
| gtgggtccgg gggcgggctc aggggcgggc tcaggggcgg ggcgggcgcc cgaaggtcct | 420 |

```
ccggaggccc ggcattccgc acgcttcaaa agcgcacgtc tgccgcgctg ttctcttctt    480
cctcatctcc gggcctttcg                                                500
```

<210> SEQ ID NO 11
<211> LENGTH: 508
<212> TYPE: DNA
<213> ORGANISM: artificial sequence
<220> FEATURE:
<223> OTHER INFORMATION: synthetic construct

<400> SEQUENCE: 11

```
cgttacataa cttacggtaa atggcccgcc tggctgaccg cccaacgacc cccgcccatt     60
gacgtcaata atgacgtatg ttcccatagt aacgccaata gggactttcc attgacgtca    120
atgggtggag tatttacggt aaactgccca cttggcagta catcaagtgt atcatatgcc    180
aagtacgccc cctattgacg tcaatgacgg taaatggccc gcctggcatt atgcccagta    240
catgacctta tgggactttc ctacttggca gtacatctac gtattagtca tcgctattac    300
catgctgatg cggttttggc agtacatcaa tgggcgtgga tagcggtttg actcacgggg    360
atttccaagt ctccacccca ttgacgtcaa tgggagtttg ttttggcacc aaaatcaacg    420
ggactttcca aaatgtcgta acaactccgc cccattgacg caaatgggcg gtaggcgtgt    480
acggtgggag gtctatataa gcagagct                                       508
```

<210> SEQ ID NO 12
<211> LENGTH: 254
<212> TYPE: PRT
<213> ORGANISM: artificial sequence
<220> FEATURE:
<223> OTHER INFORMATION: synthetic construct

<400> SEQUENCE: 12

```
Met Trp Gln Leu Leu Pro Thr Ala Leu Leu Leu Val Ser Ala
1               5                   10                  15

Gly Met Arg Thr Glu Asp Leu Pro Lys Ala Val Val Phe Leu Glu Pro
                20                  25                  30

Gln Trp Tyr Arg Val Leu Glu Lys Asp Ser Val Thr Leu Lys Cys Gln
            35                  40                  45

Gly Ala Tyr Ser Pro Glu Asp Asn Ser Thr Gln Trp Phe His Asn Glu
        50                  55                  60

Ser Leu Ile Ser Ser Gln Ala Ser Ser Tyr Phe Ile Asp Ala Ala Thr
65                  70                  75                  80

Val Asp Asp Ser Gly Glu Tyr Arg Cys Gln Thr Asn Leu Ser Thr Leu
                85                  90                  95

Ser Asp Pro Val Gln Leu Glu Val His Ile Gly Trp Leu Leu Leu Gln
            100                 105                 110

Ala Pro Arg Trp Val Phe Lys Glu Glu Asp Pro Ile His Leu Arg Cys
        115                 120                 125

His Ser Trp Lys Asn Thr Ala Leu His Lys Val Thr Tyr Leu Gln Asn
    130                 135                 140

Gly Lys Gly Arg Lys Tyr Phe His His Asn Ser Asp Phe Tyr Ile Pro
145                 150                 155                 160

Lys Ala Thr Leu Lys Asp Ser Gly Ser Tyr Phe Cys Arg Gly Leu Val
                165                 170                 175

Gly Ser Lys Asn Val Ser Ser Glu Thr Val Asn Ile Thr Ile Thr Gln
            180                 185                 190
```

```
Gly Leu Ala Val Ser Thr Ile Ser Ser Phe Phe Pro Pro Gly Tyr Gln
            195                 200                 205

Val Ser Phe Cys Leu Val Met Val Leu Leu Phe Ala Val Asp Thr Gly
    210                 215                 220

Leu Tyr Phe Ser Val Lys Thr Asn Ile Arg Ser Ser Thr Arg Asp Trp
225                 230                 235                 240

Lys Asp His Lys Phe Lys Trp Arg Lys Asp Pro Gln Asp Lys
                245                 250
```

```
<210> SEQ ID NO 13
<211> LENGTH: 765
<212> TYPE: DNA
<213> ORGANISM: artificial sequence
<220> FEATURE:
<223> OTHER INFORMATION: synthetic construct

<400> SEQUENCE: 13
atgtggcagc tgctgctgcc tacagctctc ctgctgctgg tgtccgccgg catgagaacc      60
gaggatctgc ctaaggccgt ggtgttcctg aacccccagt ggtacagagt gctggaaaag     120
gacagcgtga ccctgaagtg ccagggcgcc tacagccccg aggacaatag cacccagtgg     180
ttccacaacg agagcctgat cagcagccag gccagcagct acttcatcga cgccgccacc     240
gtggacgaca cggcgagta tagatgccag accaacctga gcaccctgag cgaccccgtg     300
cagctggaag tgcacatcgg atggctgctg ctgcaggccc ccagatgggt gttcaaagaa     360
gaggacccca tccacctgag atgccactct tggaagaaca ccgccctgca caaagtgacc     420
tacctgcaga cggcaaggg cagaaagtac ttccaccaca cagcgactt ctacatcccc      480 aaggccaccc tgaaggactc cggctcctac ttctgcagag gcctcgtggg cagcaagaac     540
gtgtccagcg agacagtgaa catcaccatc ccccagggcc tggccgtgtc taccatcagc     600
agctttttcc cacccggcta ccaggtgtcc ttctgcctcg tgatggtgct gctgttcgcc     660
gtggacaccg gcctgtactt cagcgtgaaa acaaacatca gaagcagcac ccgggactgg     720
aaggaccaca gttcaagtg cggaaggac ccccaggaca gtga                        765

<210> SEQ ID NO 14
<211> LENGTH: 483
<212> TYPE: DNA
<213> ORGANISM: artificial sequence
<220> FEATURE:
<223> OTHER INFORMATION: synthetic construct

<400> SEQUENCE: 14
atgtaccgga tgcagctgct gagctgtatc gccctgtctc tggccctcgt gaccaacagc      60
gcccctacca gcagcagcac caagaaaacc cagctgcagc tggaacatct gctgctggac     120
ctgcagatga tcctgaacgg catcaacaac tacaagaacc ccaagctgac ccggatgctg     180
accttcaagt ctacatgcc caagaaggcc accgaactga acatctgca gtgcctggaa      240 gaggaactga agcccctgga agaagtgctg aacctggccc agagcaagaa cttccacctg     300
aggcccaggg acctgatcag caacatcaac gtgatcgtgc tggaactgaa aggcagcgag     360
acaaccttca gtgcgagta cgccgacgag acagctacca tcgtggaatt tctgaaccgg     420 tggatcaccct tctgccagag catcatcagc accctgaccg gctccgagaa ggacgagctg     480
tga                                                                   483

<210> SEQ ID NO 15
<211> LENGTH: 160
```

```
<212> TYPE: PRT
<213> ORGANISM: artificial sequence
<220> FEATURE:
<223> OTHER INFORMATION: synthetic construct

<400> SEQUENCE: 15

Met Tyr Arg Met Gln Leu Leu Ser Cys Ile Ala Leu Ser Leu Ala Leu
1               5                   10                  15

Val Thr Asn Ser Ala Pro Thr Ser Ser Thr Lys Lys Thr Gln Leu
            20                  25                  30

Gln Leu Glu His Leu Leu Leu Asp Leu Gln Met Ile Leu Asn Gly Ile
        35                  40                  45

Asn Asn Tyr Lys Asn Pro Lys Leu Thr Arg Met Leu Thr Phe Lys Phe
    50                  55                  60

Tyr Met Pro Lys Lys Ala Thr Glu Leu Lys His Leu Gln Cys Leu Glu
65                  70                  75                  80

Glu Glu Leu Lys Pro Leu Glu Glu Val Leu Asn Leu Ala Gln Ser Lys
                85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr Gly Ser Glu Lys Asp Glu Leu
145                 150                 155                 160

<210> SEQ ID NO 16
<211> LENGTH: 294
<212> TYPE: DNA
<213> ORGANISM: artificial sequence
<220> FEATURE:
<223> OTHER INFORMATION: synthetic construct

<400> SEQUENCE: 16
atggccctgc tactggccct cagcctgctg gttctctgga cttccccagc cccaactctg      60
agtggcacca atgatgctga agactgctgc ctgtctgtga cccagaaacc catccctggg     120
tacatcgtga ggaacttcca ctaccttctc atcaaggatg ctgcagggt gcctgctgta      180 gtgttcacca cactgagggg ccgccagctc tgtgcacccc agaccagcc ctgggtagaa      240 cgcatcatcc agagactgca gaggacctca gccaagatga gcgccgcag cagt            294

<210> SEQ ID NO 17
<211> LENGTH: 60
<212> TYPE: DNA
<213> ORGANISM: artificial sequence
<220> FEATURE:
<223> OTHER INFORMATION: synthetic construct

<400> SEQUENCE: 17
cagtgcacca actacgccct gctgaagctg gccggcgacg tggagagcaa ccctggccct      60

<210> SEQ ID NO 18
<211> LENGTH: 54
<212> TYPE: DNA
<213> ORGANISM: artificial sequence
<220> FEATURE:
<223> OTHER INFORMATION: synthetic construct
```

```
<400> SEQUENCE: 18
gagggcagag gcagcctgct gacctgcggc gatgtggagg aaaacccagg ccca         54
```